US009812858B2

(12) United States Patent
Kawabata

(10) Patent No.: US 9,812,858 B2
(45) Date of Patent: Nov. 7, 2017

(54) SURGE PROTECTIVE SYSTEM

(71) Applicant: SANKOSHA CORPORATION, Shinagawa-Ku, Tokyo (JP)

(72) Inventor: Tsuyoshi Kawabata, Shinagawa-Ku (JP)

(73) Assignee: Sankosha Corporation, Tokyo (JP)

(*) Notice: Subject to any disclaimer, the term of this patent is extended or adjusted under 35 U.S.C. 154(b) by 235 days.

(21) Appl. No.: 14/859,445

(22) Filed: Sep. 21, 2015

(65) Prior Publication Data

US 2016/0126728 A1    May 5, 2016

(30) Foreign Application Priority Data

Oct. 31, 2014    (JP) ................................. 2014-223688

(51) Int. Cl.
H02H 9/04 (2006.01)
H01C 7/12 (2006.01)
H01C 7/10 (2006.01)

(52) U.S. Cl.
CPC .................. H02H 9/04 (2013.01); H01C 7/12 (2013.01); H01C 7/10 (2013.01)

(58) Field of Classification Search
CPC ................ H02H 9/04; H01C 7/10; H01C 7/12
See application file for complete search history.

(56) References Cited

U.S. PATENT DOCUMENTS

| 8,647,158 B2* | 2/2014 | Kawabata | H01R 9/2608 439/716 |
|---|---|---|---|
| 8,670,221 B2* | 3/2014 | Gillespie | H01R 9/2433 361/118 |
| 8,730,638 B2 | 5/2014 | Higashi | |
| 9,653,891 B2* | 5/2017 | V | H02B 1/052 |
| 2010/0315753 A1* | 12/2010 | Mosesian | H01H 85/12 361/104 |
| 2013/0083441 A1* | 4/2013 | Higashi | G01R 31/1236 361/57 |
| 2014/0204496 A1* | 7/2014 | Martinez Sanchez | H01T 4/06 361/119 |

FOREIGN PATENT DOCUMENTS

JP    2013-077483 A    4/2013

* cited by examiner

Primary Examiner — Scott Bauer
(74) Attorney, Agent, or Firm — Carrier Blackman & Associates, P.C.; Joseph P. Carrier; William D. Blackman

(57) ABSTRACT

A surge protective system has a plinth for wiring and is connected between a plurality of line side wires and a ground wire. A plurality of surge protective devices (SPDs) and one surge detector are disposed in parallel and detachably fitted into and attached to the plinth. The plinth has a wiring metal fitting for connecting the plurality of SPDs and the one surge detector. When a lightning surge current enters into the surge protective system from the line side wires, the lightning surge current flows to the surge detector through the SPDs, a 1st plinth contact part in the wiring metal fitting, a connection part and a 2nd plinth contact part. The lightning surge current flowing to the surge detector is discharged to the ground through the ground wire.

12 Claims, 20 Drawing Sheets

SURGE PROTECTIVE SYSTEM

BACKGROUND ART

Field of the Invention

The present invention relates to a surge protective system for protecting equipment to be protected against a lightning surge current flowing to a ground wire from a line of a power wire or a communication wire.

Description of the Related Art

As disclosed in, for example, Japanese Patent Laid-Open No. 2013-077483, a surge protective system of the related art protects equipment to be protected against a lightning surge current flowing to a ground wire from a line of a power wire or a communication wire. The surge protective system has a surge protective device (hereinafter, referred to as an "SPD") for discharging a lightning surge current to the ground wire. The SPD is detachably fitted into and attached to a plinth for wiring. A surge detector for detecting a lightning surge current and performing display is detachably attached at a side of the ground wire of the plinth.

The line of the power wire or the communication wire is typically comprised of a plurality of lines. The surge protective systems are respectively provided at the plurality of lines.

However, there are the following problems (1) and (2) in the surge protective system of the related art.

(1) Because the surge detector in the surge protective system of the related art is attached at the side of the ground wire of the plinth, the surge detector has shape projecting from the plinth. Therefore, when space to store a distribution frame or an SPD frame is small, it is difficult to store the surge protective system of the related art because it cannot be made more compact.

(2) The surge protective system of the related art has a configuration in which one surge detector is connected to one SPD through the plinth. The SPDs and the surge detectors corresponding to the number of lines are provided at the plurality of lines. Therefore, the surge protective system of the related art has a large number of parts, and it is difficult to store the surge protective system in a small distribution frame or a small SPD frame because it cannot be made more compact.

SUMMARY OF THE INVENTION

Therefore, to solve the above-described problems of the related art, an object of the present invention is to provide a surge protective system which can be stored in a small distribution frame or a small SPD frame as a result of the number of components being reduced so that the surge protective system is made more compact.

To achieve the above-described object, a surge protective system of the present invention includes a plinth for wiring, a plurality of SPDs disposed in parallel and detachably fitted into and attached to the plinth, and a surge detector disposed in parallel with respect to the SPDs and detachably fitted into and attached to the plinth.

The plinth includes a base in substantially box-like shape, having an opening at an upper part, a cover having a base part covering the upper part of the base and a pair of 1st side wall part and a 2nd side wall part extending upward from both side faces of the base part, a plurality of 1st plinth terminal parts stored in the base and the cover, a plurality of line side wires inserted from an outer face of the 1st side wall part being respectively connected to the plurality of 1st plinth terminal parts, a 2nd plinth terminal part stored in the base and the cover, a ground wire inserted from an outer face of the 2nd side wall part being connected to the 2nd plinth terminal part, and a wiring metal fitting stored in the base. The wiring metal fitting has a 1st plinth contact part, a 2nd plinth contact part, and a connection part connecting the 1st plinth contact part and the 2nd plinth contact part.

Each of the SPDs has a 1st case in substantially box-like shape, detachably fitted and attached between the 1st side wall part and the 2nd side wall part, and a lightning protection circuit stored in the 1st case and discharging a lightning surge current entering from a side of each of the 1st plinth terminal part to a side of the 1st plinth contact part.

The lightning surge detector has a 2nd case having substantially the same shape as the 1st case and detachably fitted and attached between the 1st side wall part and the 2nd side wall part, a detecting unit stored in the 2nd case, discharging the lightning surge current entering from a side of the 2nd plinth contact part to a side of the 2nd plinth terminal part and detecting a current value of the lightning surge current to obtain a lightning surge current detection result, and a display unit displaying the lightning surge current detection result so as to be able to be viewed from outside.

According to the surge protective system of the present invention, the SPDs and the surge detector are disposed in parallel on the plinth, and the lightning surge current entering into the SPDs is discharged to the ground wire side via the surge detector. Therefore, the surge protective system of the present invention can be made more compact and stored in a small distribution frame or an SPD frame. Further, the surge protective system of the present invention connects one surge detector to the plurality of SPDs. Therefore, the number of components is reduced, so that the surge protective system can be made more compact and thus can be stored in a small distribution frame or an SPD frame.

The above-described objects and other objects and new features of the present invention will become obvious through the following description of preferred embodiments and the accompanying drawings. However, the following drawings are provided for illustration purpose, and do not limit the scope of the present invention.

DESCRIPTION OF THE PREFERRED EMBODIMENTS

First Embodiment

Configuration of the First Embodiment

Figure 1:
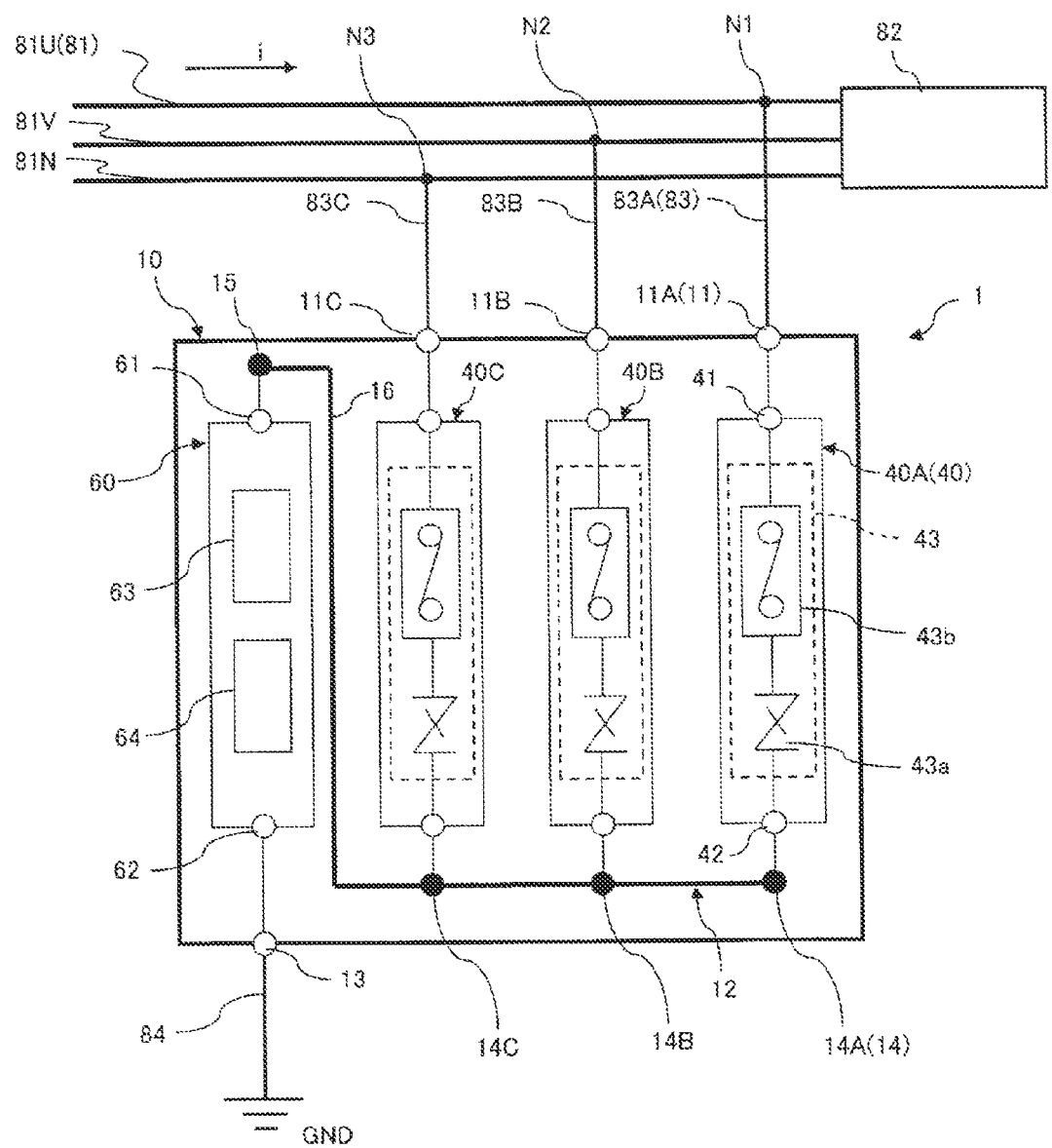
FIG. 1 is a schematic circuit configuration diagram illustrating the whole of a surge protective system according to a first embodiment of the present invention.

FIG. 1 is a schematic circuit configuration diagram illustrating the whole of a surge protective system 1 according to the first embodiment of the present invention. The surge protective system 1 is a system for protecting equipment to be protected 82 connected to a plurality of lines 81 of a power wire against a lightning surge current i. The plurality of lines 81 are, for example, single-phase three-wire power wires for supplying an input voltage (AC200V) having a ground phase. The plurality of lines 81 include, for example, three lines 81U, 81V and 81N. The surge protective system 1 is connected to a plurality of line side wires 83 which is branched from the three lines 81 at branch points N1, N2 and N3. The plurality of line side wires 83 include, for example, three line side wires 83A, 83B and 83C.

The surge protective system 1 is configured with a plinth 10 for wiring, a plurality of SPDs 40 and one surge detector 60. The plinth 10 is an apparatus for wiring, for connecting the plurality of SPDs 40 and one surge detector 60. The plurality of SPDs 40 are apparatuses which conduct when the lightning surge current i enters therein and make the lightning surge current i flow to the surge detector 60, and are detachably fitted into and attached to the plinth 10. The plurality of SPDs 40 include, for example, three SPDs 40A, 40B and 40C. The surge detector 60 which is an apparatus detecting the lightning surge current i and displaying the detection result, is disposed in parallel with respect to the three SPDs 40 and detachably fitted into and attached to the plinth 10. The surge protective system 1 is connected to a ground GND via the ground wire 84.

At the plinth 10, a plurality of 1st plinth terminal parts 11 and one 2nd plinth terminal part 13 are provided. The plurality of 1st plinth terminal parts 11 are provided at a side of the three lines 81 so as to be connected to the three line side wires 83. One 2nd plinth terminal part 13 is provided at the ground GND side so as to be connected to the ground wire 84. The plurality of 1st plinth terminal parts 11 include, for example, three 1st plinth terminal parts 11A, 11B and 11C. The three 1st plinth terminal parts 11 are connected to the equipment to be protected 82 via the three line side wires 83. The three 1st plinth terminal parts 11 are respectively connected to ends of the three SPDs 40. At the other ends of the three SPDs 40, one end of the surge detector 60 is connected via the wiring metal fitting 12. The wiring metal fitting 12 is stored in the plinth 10 and connects the three SPDs 40 and the surge detector 60. At the other end of the surge detector 60, the 2nd plinth terminal part 13 is connected. The 2nd plinth terminal part 13 is connected to the ground GND via the ground wire 84.

The wiring metal fitting 12 has a plurality of 1st plinth contact parts 14, one 2nd plinth contact part 15 and a connection part 16. The plurality of 1st plinth contact parts 14 are provided at the ground GND side so as to be connected to the three SPDs 40. The plurality of 1st plinth contact parts 14 include, for example, three 1st plinth contact parts 14A, 14B and 14C. The 2nd plinth contact part 15 is provided at a side of the line 81 so as to be connected to the surge detector 60. The connection part 16 connects the three 1st plinth contact parts 14 and one 2nd plinth contact part 15.

Each of the SPDs 40 has a 1st contact 41 and a 2nd contact 42. The 1st contact 41 is provided at the line 81 side and connected to the 1st plinth terminal part 11 of the plinth 10. The 2nd contact 42 is provided at the ground GND side and connected to the 1st plinth contact part 14 of the wiring metal fitting 12. A lightning protection circuit 43 is connected between the 1st contact 41 and the 2nd contact 42.

The lightning protection circuit 43 is a circuit for discharging the lightning surge current i entering from the 1st contact 41 to the surge detector 60. The lightning protection circuit 43 has a varistor 43a and a separation mechanism 43b. The varistor 43a and the separation mechanism 43b are connected in series between the 1st contact 41 and the 2nd contact 42. The varistor 43a is a non-linear resistant device which is short-circuited when the lightning surge current i flows, thereby causing the lightning surge current i to conduct. If the varistor 43a degrades by an excessive lightning surge current i, a large amount of current leaks or the varistor 43a may burn out. Therefore, the separation mechanism 43b is provided to separate the varistor 43a from the circuit. The separation mechanism 43b is configured with a solder component, or the like, which is fused and cut when the varistor 43a is heated to a specified temperature or higher.

The surge detector 60 has a 3rd contact 61, a 4th contact 62, a detecting unit 63 and a display unit 64. The 3rd contact 61 which is provided at the line 81 side, is connected to the 2nd plinth contact part 15 of the wiring metal fitting 12. The 4th contact 62 which is provided at the ground GND side, is connected to the 2nd plinth terminal part 13 of the plinth 10. The detecting unit 63 is an apparatus for detecting the lightning surge current i. The display unit 64 is an apparatus for displaying the lightning surge current detection result detected at the detecting unit 63.

Figure 2:
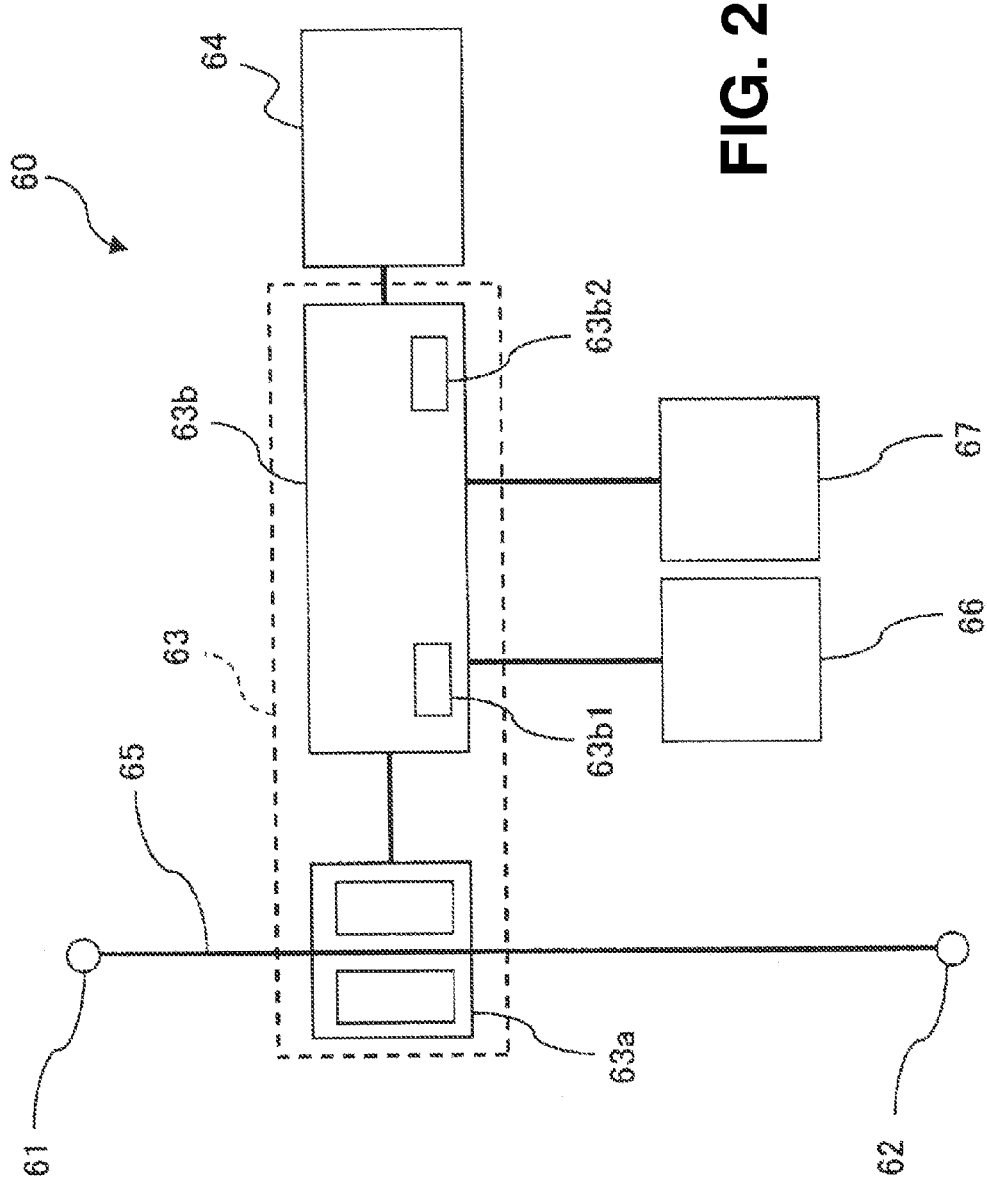
FIG. 2 is a schematic circuit configuration diagram illustrating a surge detector in FIG. 1.

FIG. 2 is a schematic circuit configuration diagram illustrating the surge detector 60 in FIG. 1. The surge detector 60 has a 3rd contact 61, a 4th contact 62, a detecting unit 63, a display unit 64, a connection bar 65, a battery 66 and a confirmation button 67. The 3rd contact 61 and the 4th contact 62 are connected by the connection bar 65. The detecting unit 63 has a detector coil 63a worn around an outer periphery of the connection bar 65, and a control unit 63b connected to the detector coil 63a. The detector coil 63a is an apparatus for outputting an induced current induced by the lightning surge current i to detect the lightning surge current i flowing through the connection bar 65.

The control unit 63b which is an apparatus for controlling overall operation of the surge detector 60, has, for example, an operation control unit 63b1 and a memory 63b2. The operation control unit 63b1 converts the induced current output from the detector coil 63a into a voltage to generate a detection voltage, performs extension processing in a time axis on a voltage waveform of the detection voltage to output the modified waveform, calculates a current value of the lightning surge current i from a voltage value using the modified waveform, and obtains a lightning surge current detection result including the number of times of processing n and a maximum current value im. The memory 63b2 is an apparatus for storing the number of times of processing n and the maximum current value im in the lightning surge current detection result. The display unit 64, the battery 66 and the confirmation button 67 are connected to the control unit 63b. The battery 66 supplies power. The confirmation button 67 is a switch for causing the number of times of processing n and the maximum current value im stored in the memory 63b2 to be displayed at the display unit 64.

Figure 3:
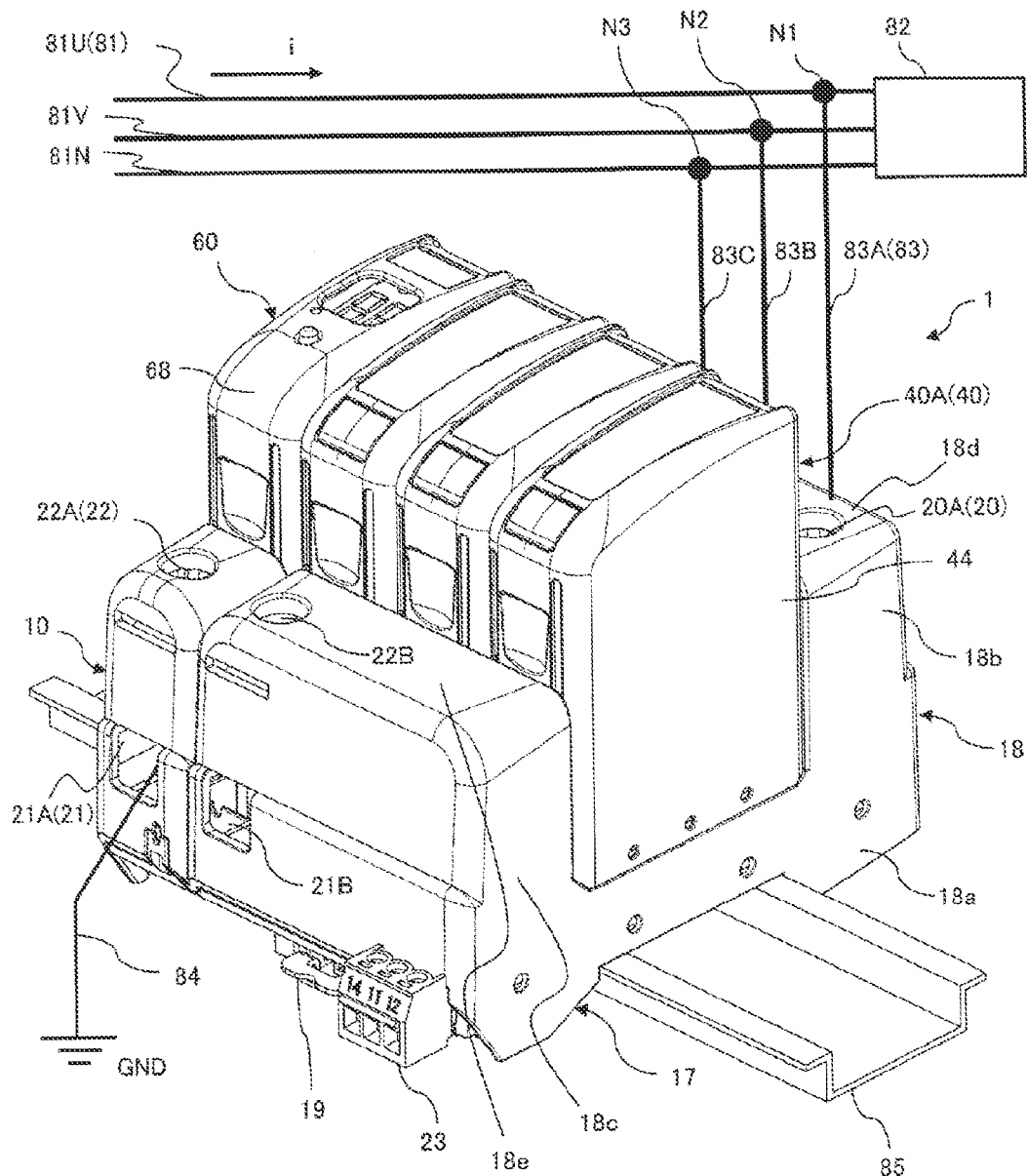
FIG. 3 is a perspective view of appearance illustrating the surge protective system in FIG. 1.

FIG. 3 is a perspective view of appearance illustrating the surge protective system 1 in FIG. 1. The plinth 10 of the surge protective system 1 has a base 17 in substantially box-like shape, having an opening at an upper part, and the upper part of the base 17 is covered with a cover 18. The base 17 and the cover 18 are formed with an insulating member such as plastic. The cover 18 is configured with a base part 18a which covers the base 17, and a pair of a 1st side wall part 18b and a 2nd side wall part 18c provided to extend upward from both side faces of the base part 18a. At a bottom of the base 17, metal fittings for locking 19 is attached so as to be able to move forward and backward. The metal fittings for locking 19 have a function of holding a mounting rail for equipment (for example, a DIN rail) 85 therebetween to lock the mounting rail for equipment 85 to fix the plinth 10 so as to be able to be removed.

The DIN rail 85 is a metal fitting for mounting equipment having, for example, width of 35 mm specified in DIN standards. The DIN standards specify a switch used with AC 1000 V or lower or DC 1500 V or lower, and a rail for mounting equipment, which is a rail for mounting electronic equipment such as an industrial terminal block.

At the 1st side wall part 18b, a 1st opening part which is not illustrated, into which a plurality of line side wires 83 are inserted is provided. The plurality of line side wires 83 are inserted into the 1st opening part and connected to the plurality of 1st plinth terminal parts 11 in FIG. 1. On an upper face 18d of the 1st side wall part 18b, a plurality of screw holes 20 for fixing the plurality of line side wires 83 inserted into the 1st opening part are provided. The plurality of screw holes 20 include, for example, a screw hole 20A, and two screw holes 20B and 20C which are not illustrated.

At the 2nd side wall part 18c, a plurality of 2nd opening parts 21 into which the ground wire 84 is inserted are provided. The plurality of 2nd opening parts 21 include, for example, two 2nd opening parts 21A and 21B. The ground wire 84 is inserted into the 2nd opening part 21A and connected to the 2nd plinth terminal part 13 in FIG. 1. The 2nd opening part 21B is provided for preliminary use. On an upper face 18e of the 2nd side wall part 18c, a plurality of screw holes 22 for fixing the ground wire 84 are respectively provided. The plurality of screw holes 22 include, for example, two screw holes 22A and 22B. At a bottom of the 2nd side wall part 18c, a terminal for replacement identification 23 of the SPD 40 is provided.

Each SPD 40 has a 1st case 44 in substantially box-like shape for storing parts of the SPD 40. The 1st case 44 is formed with an insulating member such as plastic, and the lightning protection circuit 43 in FIG. 1 is stored inside the 1st case 44. The surge detector 60 has a 2nd case 68 in substantially box-like shape for storing parts of the surge detector 60. The 2nd case 68 is formed with an insulating member such as plastic, and the detecting unit 63 in FIG. 2, or the like, is stored inside.

Figure 4:
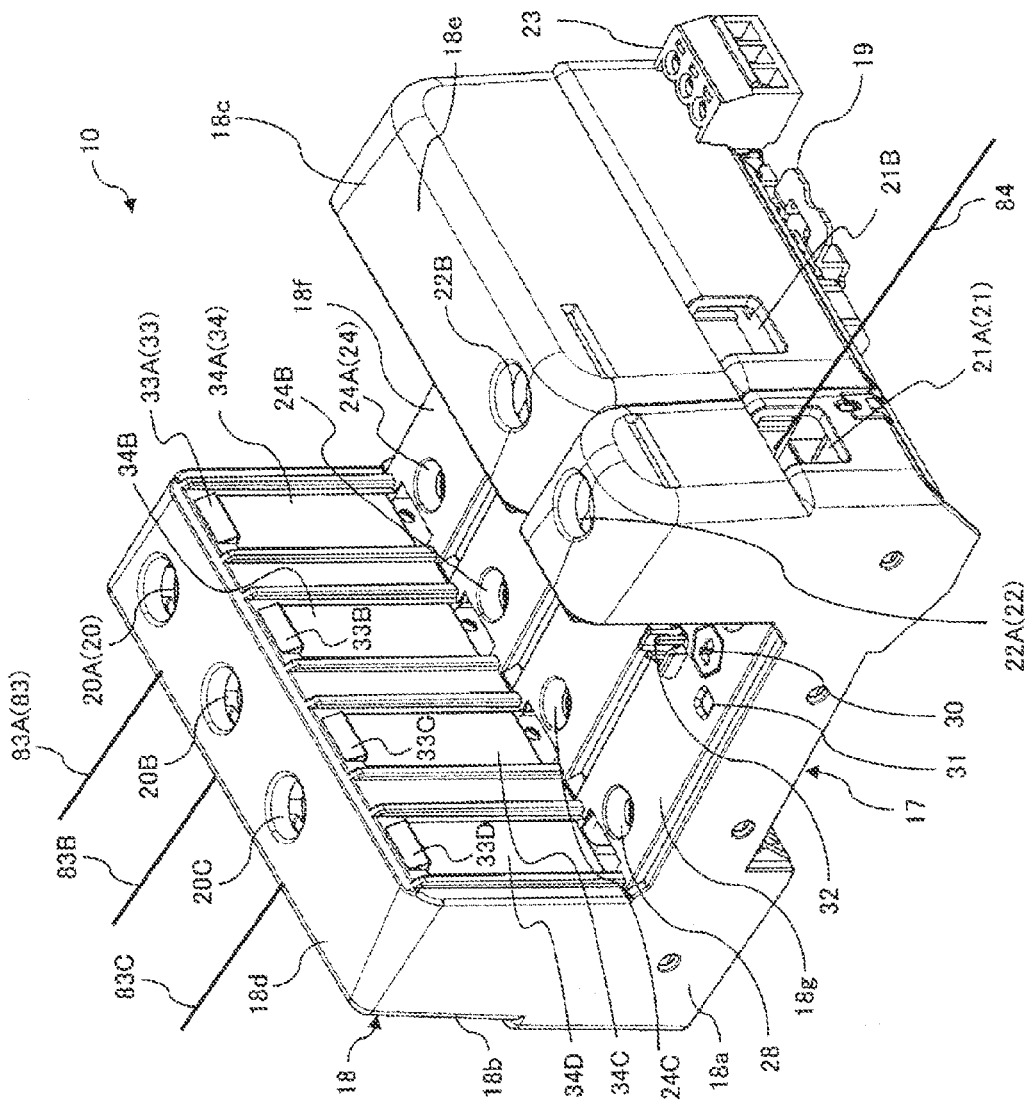
FIG. 4 is a perspective view illustrating a plinth in FIG. 3.
Figure 5:
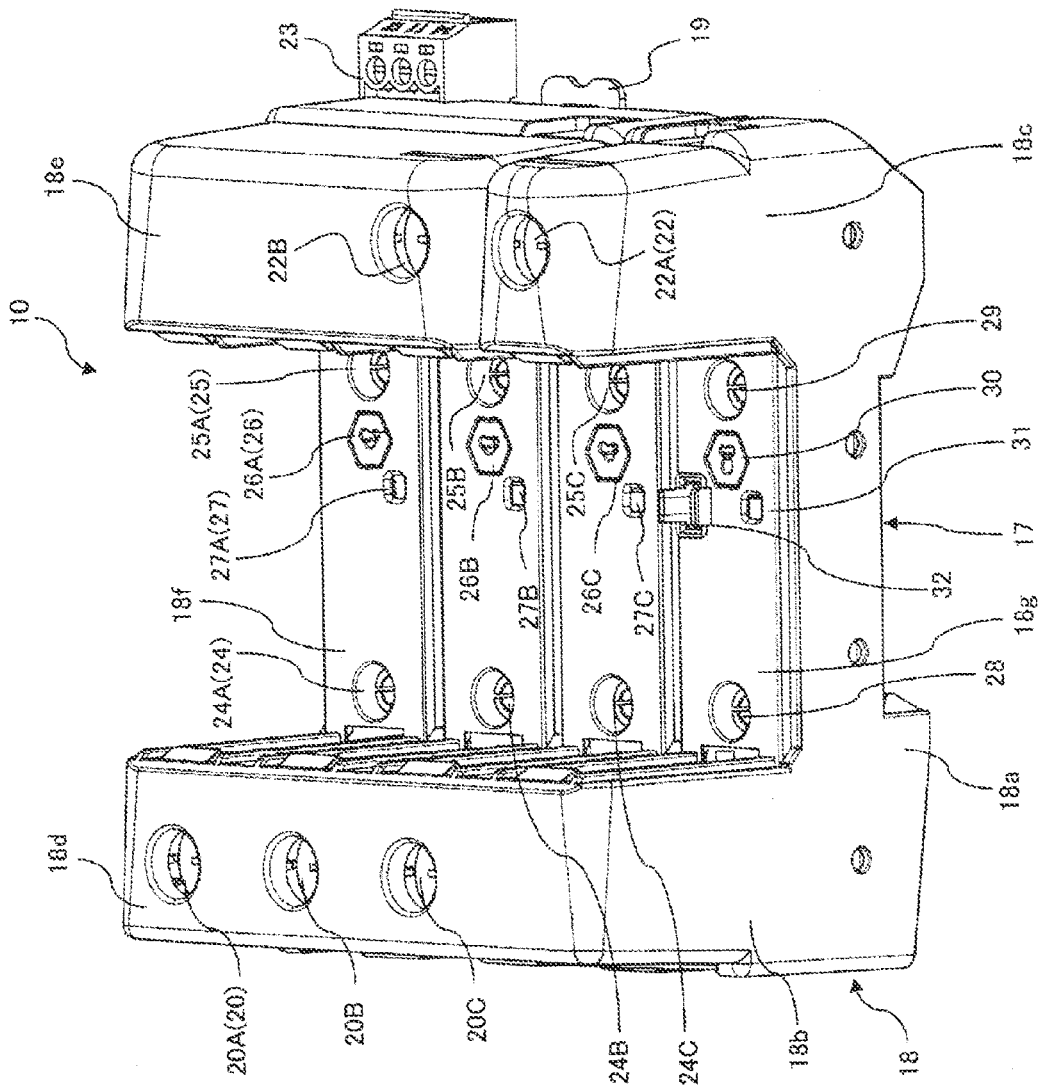
FIG. 5 is a perspective view of the plinth in FIG. 4 viewed from a left side.

FIG. 4 is a perspective view illustrating the plinth 10 in FIG. 3. Further, FIG. 5 is a perspective view of the plinth 10 in FIG. 4 viewed from a left side. The base part 18a of the plinth 10 illustrated in FIG. 4 and FIG. 5 has three placement faces 18f on which three SPDs 40 are loaded and one placement face 18g on which the surge detector 60 is loaded.

On the placement face 18f of each SPD 40, a plurality of contact holes 24 for being connected with the 1st contact 41, a plurality of contact holes 25 for being connected with the 2nd contact 42, a plurality of erroneous insertion prevention holes 26, and a plurality of switch holes 27 are formed. The plurality of contact holes 24 include, for example, three contact holes 24A, 24B and 24C. The plurality of contact holes 25 include, for example, three contact holes 25A, 25B and 25C. The plurality of erroneous insertion prevention holes 26 prevent erroneous connection of the SPD 40 due to insertion in an opposite direction, and include, for example, three erroneous insertion prevention holes 26A, 26B and 26C. Switch pressing members 51 to be inserted into the plurality of switch holes 27 are provided at the three SPDs 40. When the pressing members 51 are inserted into the plurality of switch holes 27, a switch which is provided inside the base 17 and which is not illustrated is put into an ON state. The plurality of switch holes 27 include, for example, three switch holes 27A, 27B and 27C.

On the placement face 18g of the surge detector 60, two contact holes 28 and 29, the erroneous insertion prevention hole 30, the switch hole 31 and a terminal hole 32 are formed. The contact hole 28 is a hole into which the 3rd contact 61 of the surge detector 60 is inserted and connected. The contact hole 29 is a hole into which the 4th contact 62 of the surge detector 60 is inserted and connected. The erroneous insertion prevention hole 30 prevents erroneous connection of the surge detector 60 due to insertion in an opposite direction. A switch pressing member 76 to be inserted into the switch hole 31 is provided at the surge detector 60. When the pressing member 76 is inserted into the switch hole 31, a switch which is provided inside the base 17 and which is not illustrated is put into an ON state. The terminal hole 32 is a terminal for supplying power.

An inner face of the 1st side wall part 18b of the plinth 10 contacts the outer faces of the 1st case 44 and the 2nd case 68 in FIG. 3. On the inner face of the 1st side wall part 18b, a plurality of engagement convex parts 33 are provided at an upper part, and a plurality of guiding parts 34 are provided at a lower part. The plurality of engagement convex parts 33 are projections for engaging the 1st case 44 and the 2nd case 68 with the cover 18. The plurality of engagement convex parts 33 include, for example, four engagement convex parts 33A, 33B, 33C and 33D. The plurality of guiding parts 34 cause the outer faces of the 1st case 44 and the 2nd case 68 to slide when the 1st case 44 and the 2nd case 68 are inserted into or pulled out from the cover 18. The plurality of guiding parts 34 include, for example, four guiding parts 34A, 34B, 34C and 34D.

Figure 6:
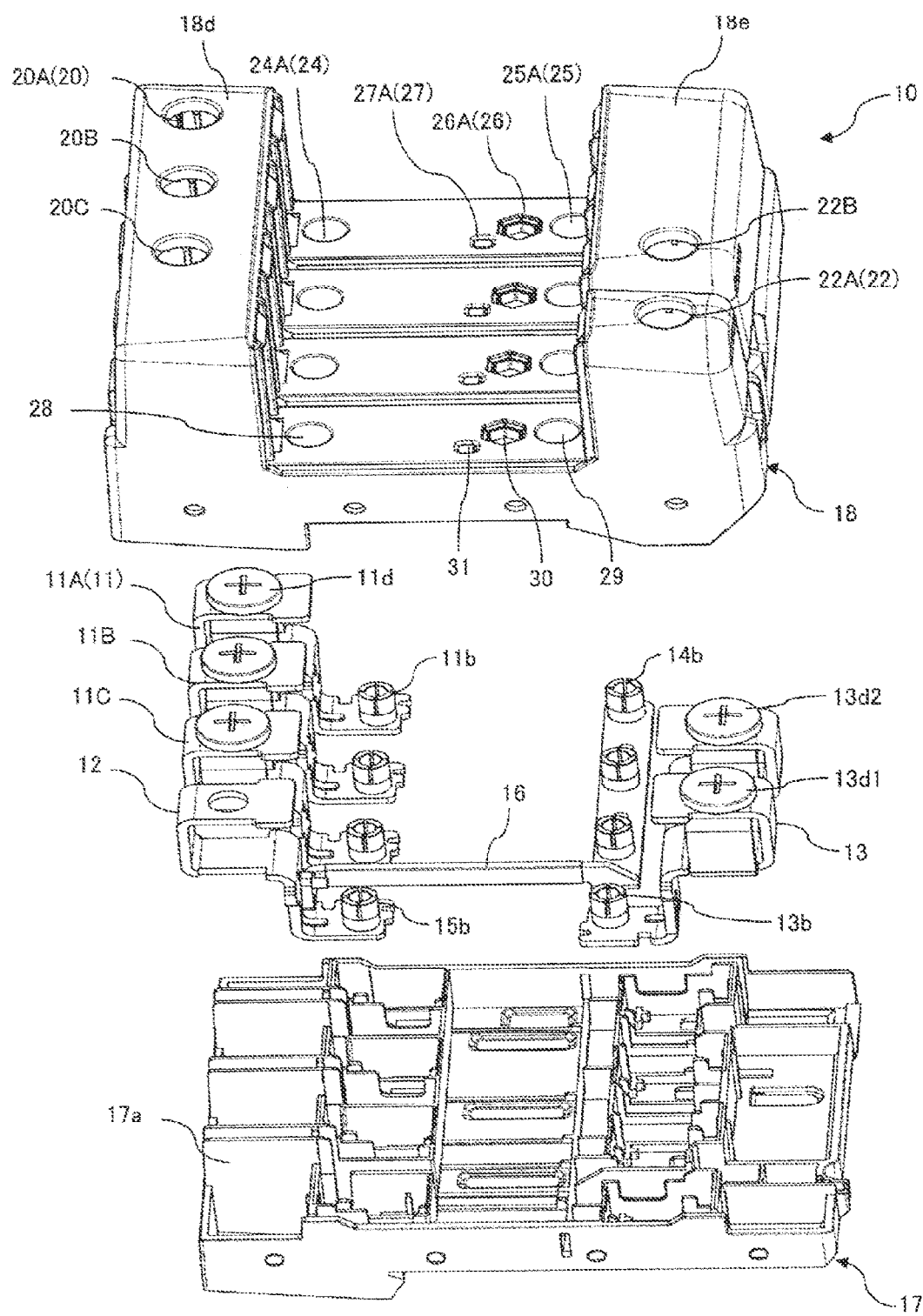
FIG. 6 is a perspective view illustrating a state where the plinth in FIG. 4 is disassembled.
Figure 7:
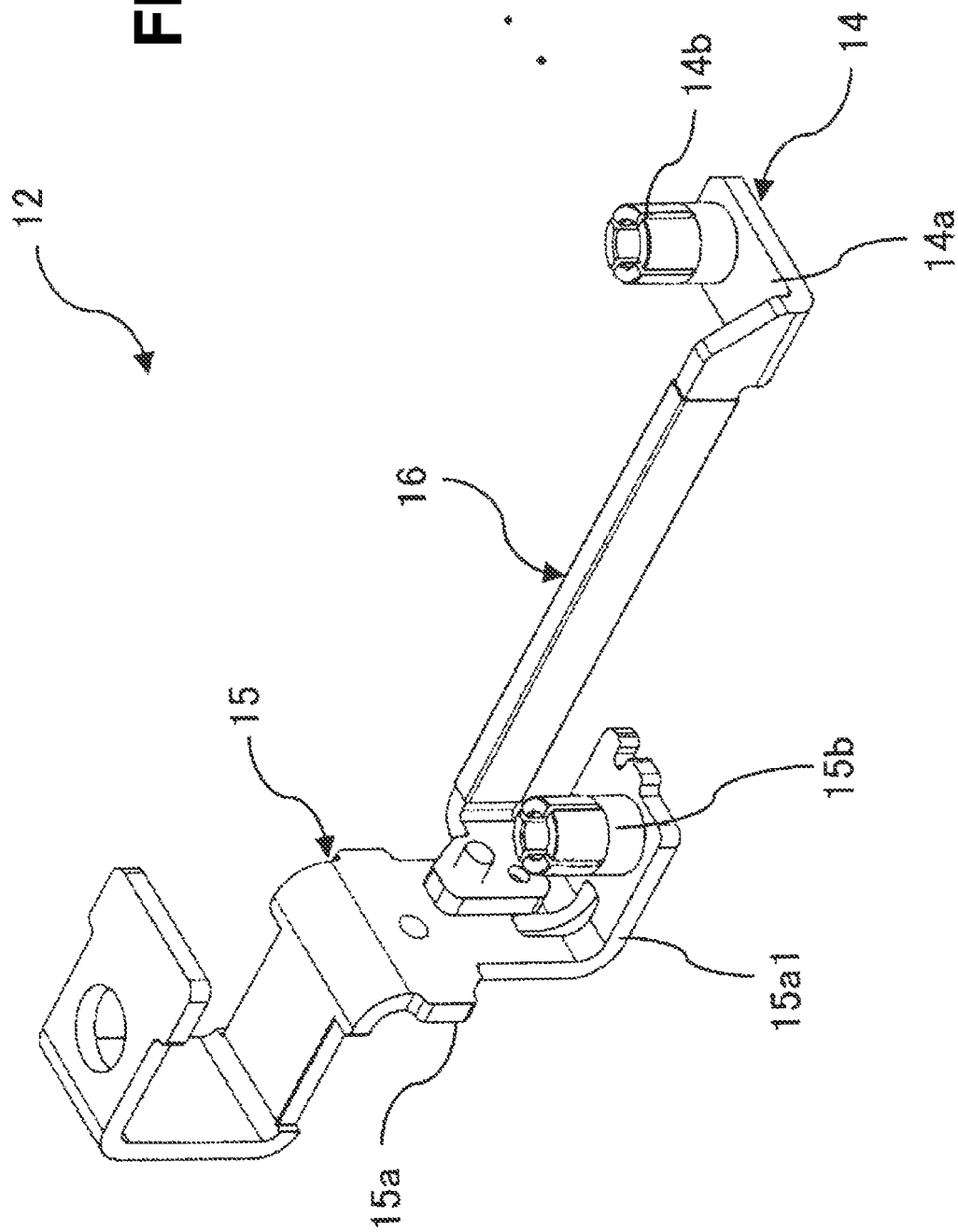
FIG. 7 is an enlarged perspective view illustrating a wiring metal fitting in FIG. 6.
Figure 8:
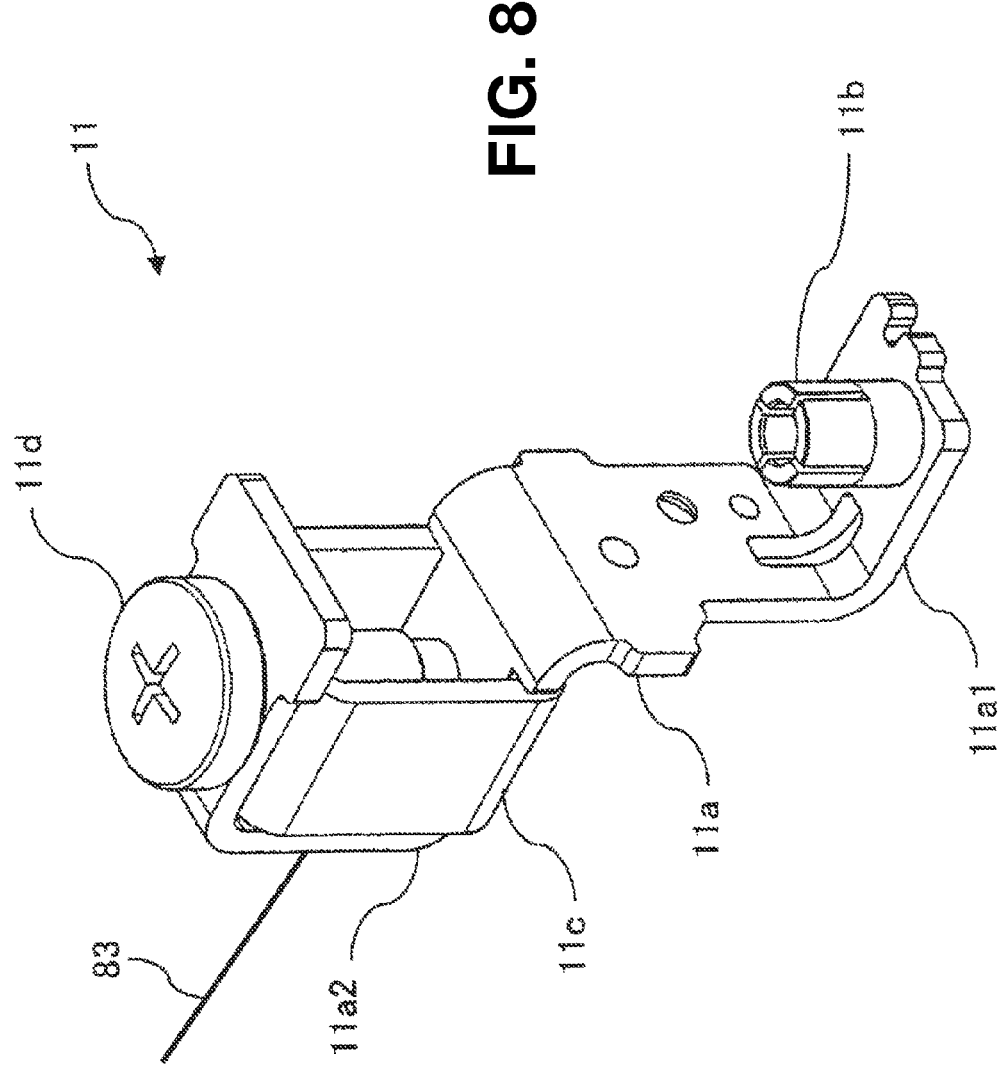
FIG. 8 is an enlarged perspective view illustrating a 1st plinth terminal part in FIG. 6.
Figure 9:
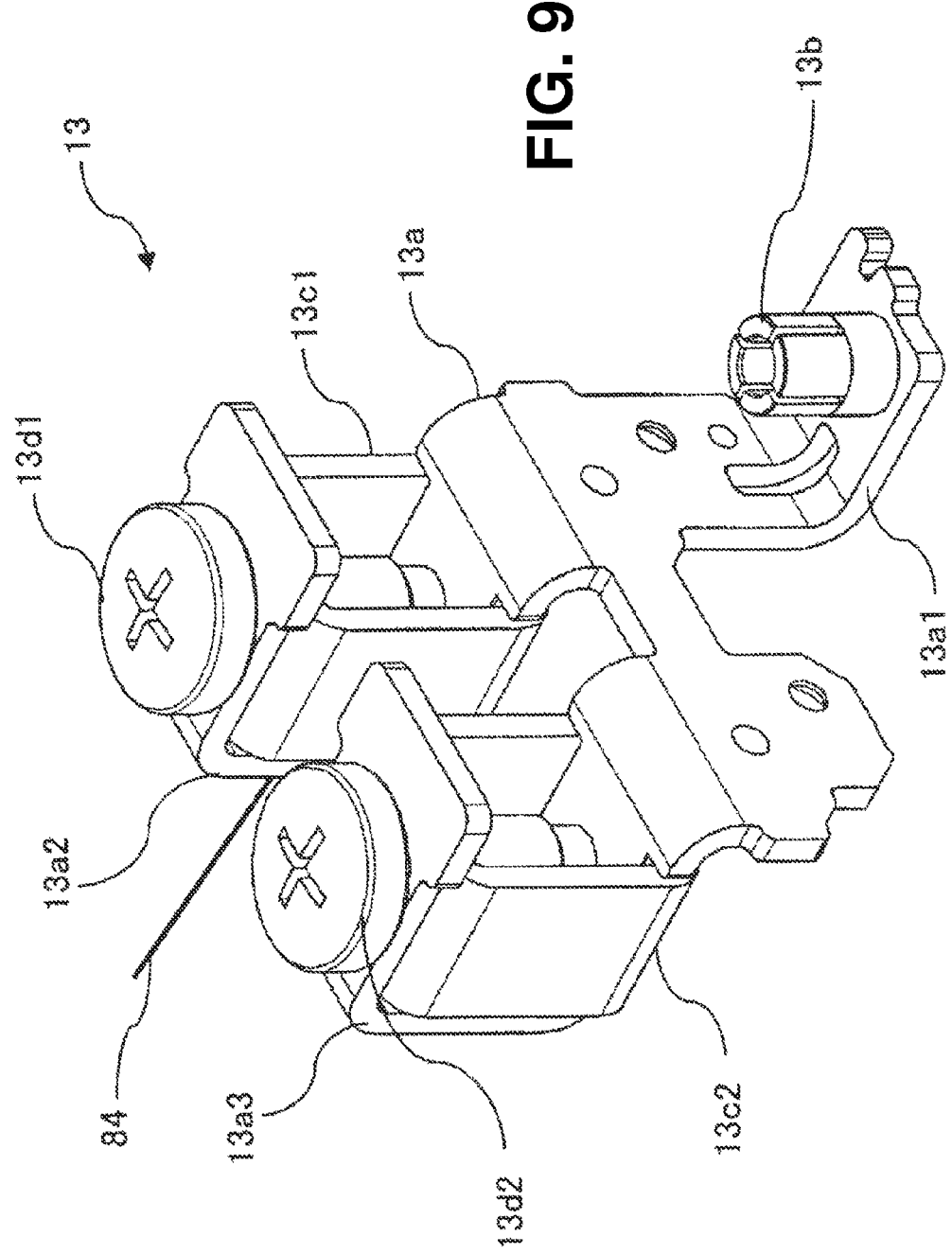
FIG. 9 is an enlarged perspective view illustrating a 2nd plinth terminal part in FIG. 6.

FIG. 6 is a perspective view illustrating a state where the plinth 10 in FIG. 4 is disassembled. FIG. 7 is an enlarged perspective view illustrating the wiring metal fitting 12 in FIG. 6. FIG. 8 is an enlarged perspective view illustrating the 1st plinth terminal part 11 in FIG. 6. Further, FIG. 9 is an enlarged perspective view illustrating the 2nd plinth terminal part 13 in FIG. 6.

A plurality of partition plates 17a are provided on the base 17 of the plinth 10 illustrated in FIG. 6. The plurality of partition plates 17a separate three metallic 1st plinth terminal parts 11, the wiring metal fitting 12 and the metallic 2nd plinth terminal part 13 from each other. The three 1st plinth terminal parts 11, the wiring metal fitting 12 and the 2nd plinth terminal part 13 are stored in the base 17 while being separated by the plurality of partition plates 17a. The three 1st plinth terminal parts 11 are provided for inserting and fixing the three line side wires 83. The wiring metal fitting 12 is provided for discharging the lightning surge current i entering into the SPD 40 to the surge detector 60. The 2nd plinth terminal part 13 is provided for inserting and fixing the ground wire 84.

The wiring metal fitting 12 illustrated in FIG. 7 is configured with a 1st plinth contact part 14, a 2nd plinth contact part 15 and a connection plate 16 as a connection part. The connection plate 16 is a thin plate-like member for conduction for connecting the 1st plinth contact part 14 and the 2nd plinth contact part 15.

The 1st plinth contact part 14 is configured with a support plate 14a and a plurality of 1st plinth contacts 14b. The support plate 14a is a thin plate-like member connected to one end of the connection plate 16 in a direction substantially perpendicular to the connection plate 16. The plurality of 1st plinth contacts 14b are fixed on the support plate 14a, have substantially cylindrical shape in which a vertical groove is formed and an opening is provided at an upper part, and the 2nd contact 42 of the SPD is inserted into the plurality of 1st plinth contacts 14b.

The 2nd plinth contact part 15 is configured with a support member 15a and a 2nd plinth contact 15b. The support member 15a is connected at the other end of the connection plate 16, which is at an opposite side of the support plate 14a, in a direction substantially perpendicular to the connection plate 16. The support member 15a has a plate-like support part 15a1 for fixing the 2nd plinth contact 15b. The 2nd plinth contact 15b is fixed on the support part 15a1, has substantially cylindrical shape in which a vertical groove is formed and an opening is provided at an upper part, and the 3rd contact 61 of the surge detector 60 is inserted into the 2nd plinth contact 15b.

The plinth terminal part 11 illustrated in FIG. 8 is configured with a support member 11a, a plinth contact 11b, a fixing frame 11c and a screw 11d. The support member 11a has a support plate 11a1 which is provided at a lower part of the support member 11a and which has a substantially L-shaped cross section, and a support frame 11a2 which extends on an upper part of the support plate 11a1 and which has a substantially U-shaped cross section. The support plate 11a1 is provided for fixing the plinth contact 11b. The support frame 11a2 is provided for providing the fixing frame 11c and a screw hole through which the screw 11d passes is formed.

The plinth contact 11b is a substantially cylindrical member fixed on the support plate 11a1, and a plurality of vertical grooves are formed at an opening part at the upper part of the substantially cylindrical member, so that the 1st contact 41 of the SPD 40 can be detachably received. The fixing frame 11c is a member having a substantially square cross section for fixing the line side wire 83, and is disposed below the screw hole in the support frame 11a2 and attached by the screw 11d so as to be able to move upward and downward. The screw 11d is screwed into the screw hole of the support frame 11a2, and the line side wire 83 inserted into the fixing frame 11c is fixed by this screw 11d being tightened.

The 2nd plinth terminal part 13 illustrated in FIG. 9 is configured with a support member 13a, a plinth contact 13b, two fixing frames 13c1 and 13c2, and two screws 13d1 and 13d2. The support member 13a has a support plate 13a1 which is provided at a lower part of the support member 13a and which has a substantially L-shaped cross section, and two support frames 13a2 and 13a3 which extend on an upper part of the support plate 13a1 and which have substantially U-shaped cross sections. The support plate 13a1 is provided for fixing the plinth contact 13b. The two support frames 13a2 and 13a3 are provided for respectively providing the two fixing frames 13c1 and 13c2, and screw holes through which the two screws 13d1 and 13d2 pass are respectively formed.

The plinth contact 13b is a substantially cylindrical member fixed on the support plate 13a1, and a plurality of vertical grooves are formed at an opening part on an upper part of the substantially cylindrical member, so that the 4th contact 62 of the surge detector 60 can be detachably received. The two fixing frames 13c1 and 13c2 are members having substantially square cross sections for fixing the ground wire 84, disposed below the two screw holes at the two support frames 13a2 and 13a3 and attached with the two screws 13d1 and 13d2 so as to be able to move upward and downward. The two screws 13d1 and 13d2 are screwed into the screw holes of the two support frames 13a2 and 13a3, and the ground wire 84 inserted into the fixing frames 13c1 and 13c2 is fixed by the screws 13d1 and 13d2 being tightened.

Figure 10:
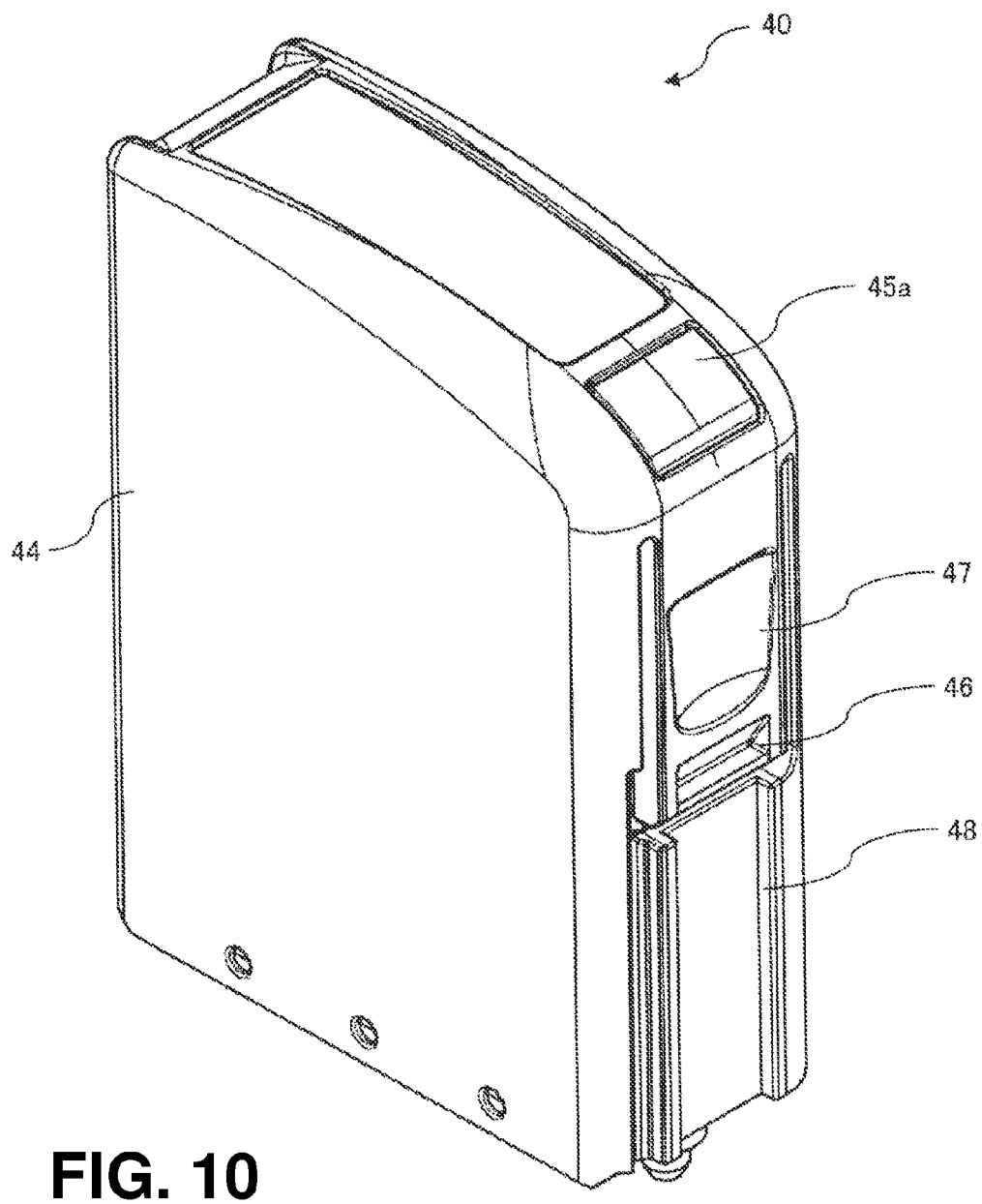
FIG. 10 is a perspective view illustrating an SPD in FIG. 3.

FIG. 10 is a perspective view illustrating the SPD 40 in FIG. 3. At the 1st case 44 of the plurality of SPDs 40, a display window 45a, an engagement concave part 46, a grip part 47 and a guiding part 48 are provided. The display window 45a which is provided on an upper face of the 1st case 44, provides notification of a separation state of the separation mechanism 43b which is separated by heating of the varistor 43a through change of a displayed color, or the like. The engagement concave part 46 is provided at the central part of a forward side face of the 1st case 44, and engaged with the engagement convex part 33 of the plinth 10 to fix the 1st case 44. The grip part 47 extends on the engagement concave part 46 at an upper part of the forward side face of the 1st case 44. The engagement convex part 33 is disengaged from the engagement concave part 46 by the grip part 47 being pressed. The guiding part 48 is provided at a lower part of the forward side face of the 1st case 44. The guiding part 48 has a projection for guiding the 1st case 44 while being engaged with the guiding part 34 of the plinth 10 when the 1st case 44 is inserted into the plinth 10, and is provided for inserting the 1st case 44 into the plinth 10 and guiding the 1st case 44.

Figure 11:
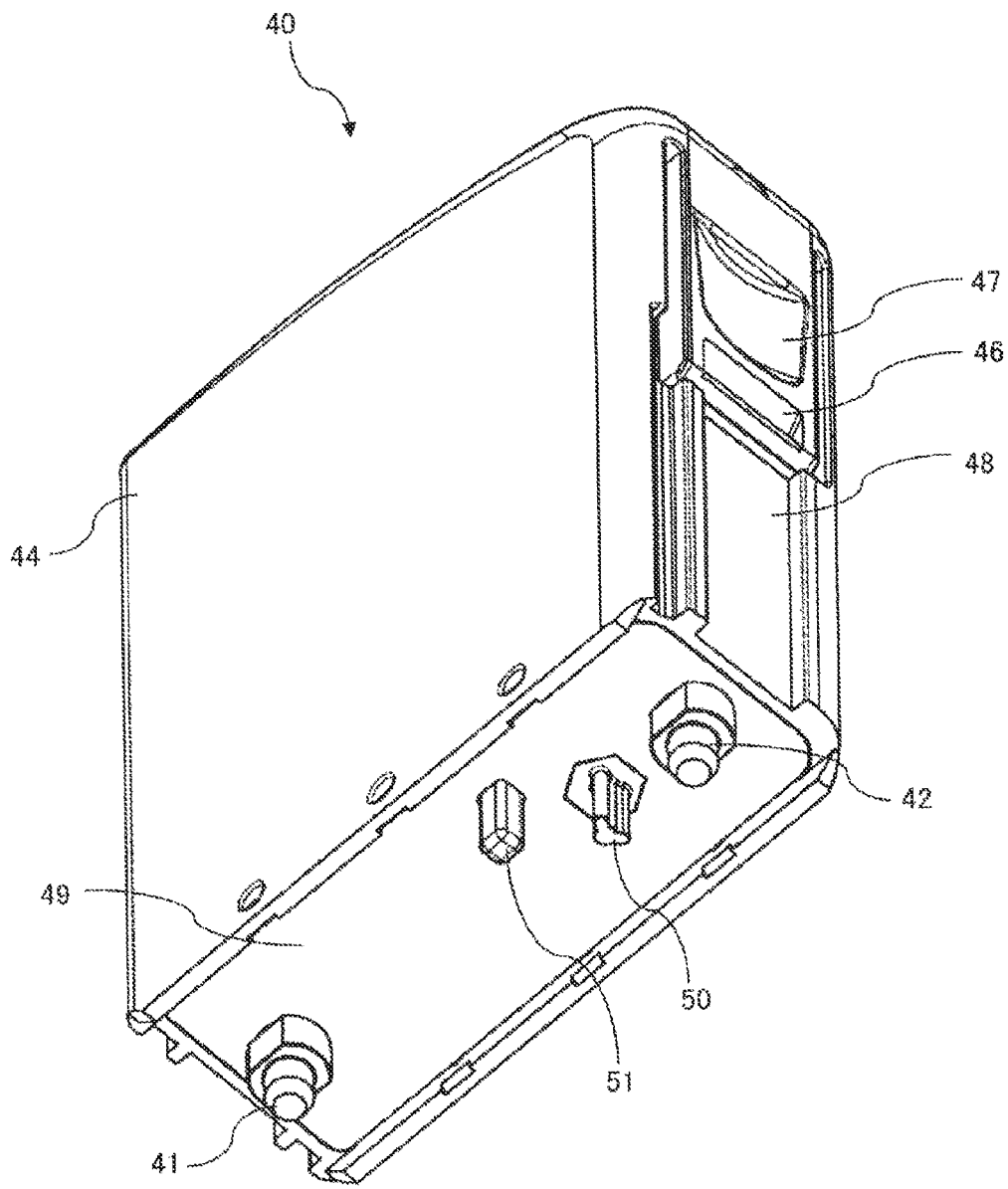
FIG. 11 is a perspective view of the SPD in FIG. 10 viewed from below.

FIG. 11 is a perspective view of the SPD 40 in FIG. 10 viewed from below. Each SPD 40 has a bottom cover 49 which blockades a lower part of the 1st case 44. At the bottom cover 49, a 1st contact 41 in substantially cylindrical shape, a 2nd contact 42 in substantially cylindrical shape, an erroneous insertion prevention member 50, and a switch pressing member 51 in substantially prismatic shape respectively project. The 1st contact 41 is attached by insertion to the contact hole 24 of the plinth 10 so as to be connected to the 1st plinth terminal part 11. The 2nd contact 42 is attached by insertion to the contact hole 25 of the plinth 10 so as to be connected to the 1st plinth contact part 14. The erroneous insertion prevention member 50 is provided for preventing the SPD 40 from being inserted in an opposite direction. The switch pressing member 51 is inserted into the switch hole 27 to put a switch which is provided inside the plinth 10 and which is not illustrated into an ON state.

Figure 12:
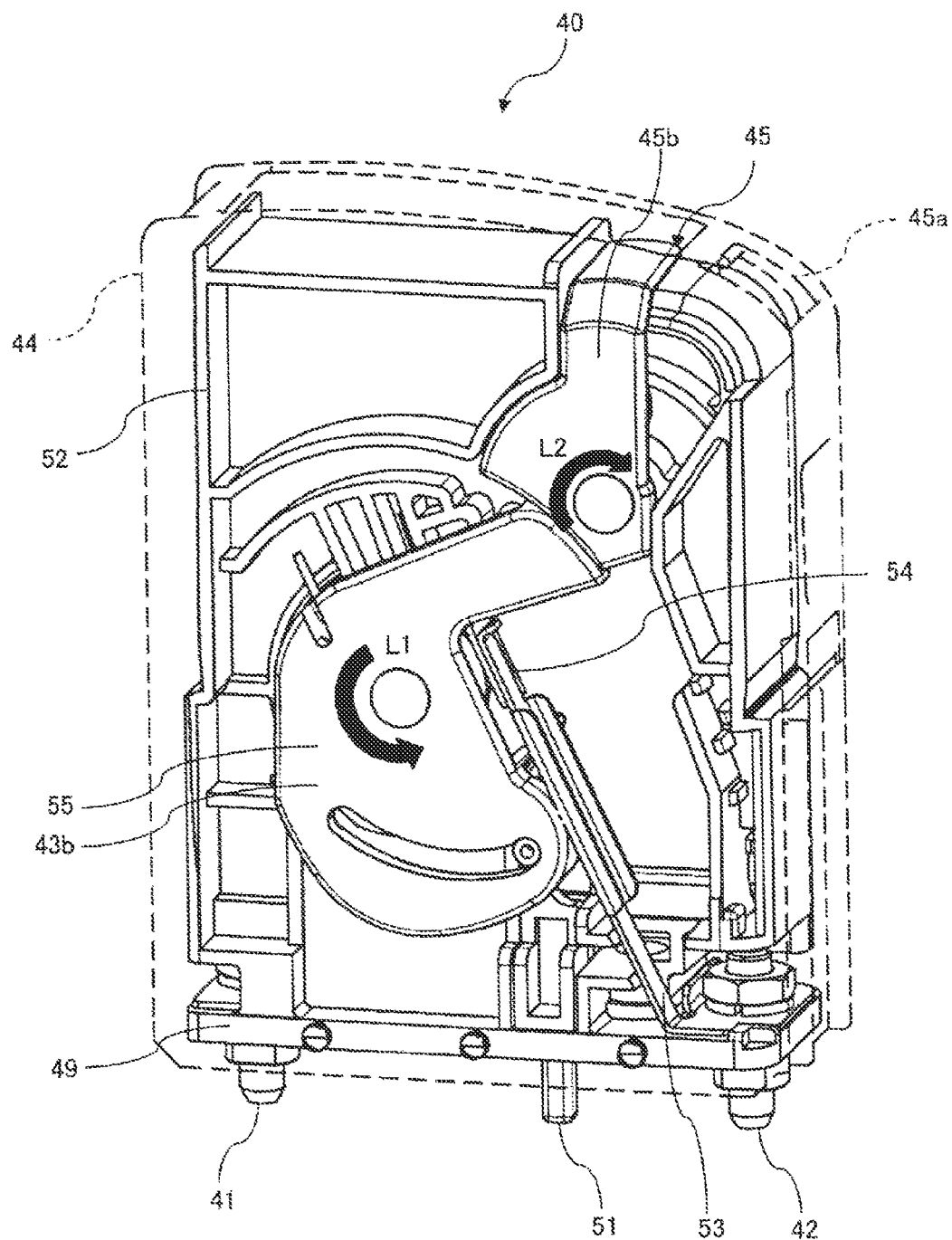
FIG. 12 is a transparent perspective view illustrating inside of the SPD in FIG. 10.

FIG. 12 is a transparent perspective view illustrating inside of the SPD 40 in FIG. 10. The SPD 40 has an inner frame 52 for fixing a plurality of members. The inner frame 52 is, for example, a green insulating member, and is provided in a direction perpendicular to the bottom cover 49 inside the 1st case 44. At the bottom cover 49, a thin plate-like connection piece 53 is obliquely installed upward along the inner frame 52. At a tip at an upper part of the connection piece 53, a separation mechanism 43b is allocated. The separation mechanism 43b is configured with a fuse 54 and a moving rotationally plate 55. An end of the fuse 54 is attached to the tip at the upper part of the connection piece 53. The fuse 54 is fused and cut by heating of the varistor 43a which is attached at a back side of the SPD 40 and which is not illustrated, to inhibit the lightning surge current i from entering into the 2nd contact 42.

The moving rotationally plate 55 has substantially elliptic plate-like shape, has a salience part in an upper right direction, and the other end of the fuse 54 is attached to the salience part. The moving rotationally plate 55 is attached to move rotationally in an arrow L1 direction in FIG. 12 when the fuse 54 is fused and cut. At a tip of the salience part of the moving rotationally plate 55, a display unit 45 is attached. The display unit 45 is configured with a display window 45a and a display color plate 45b. The display color plate 45b which is, for example, a red member in substantially fan-like shape, has a salience part projecting upward and extending in a depth direction. The display color plate 45b is attached to move rotationally in an arrow L2 direction in accordance with rotation of the moving rotationally plate 55 in the arrow L1 direction. In a normal state before the fuse 54 is fused and cut, display color of green which is color of the inner frame 52 is displayed at the display window 45a. When the moving rotationally plate 55 and the display color plate 45b move rotationally by the fuse 54 being fused and cut, display color of red which is color of the display color plate 45b is displayed at the display window 45a.

Figure 13:
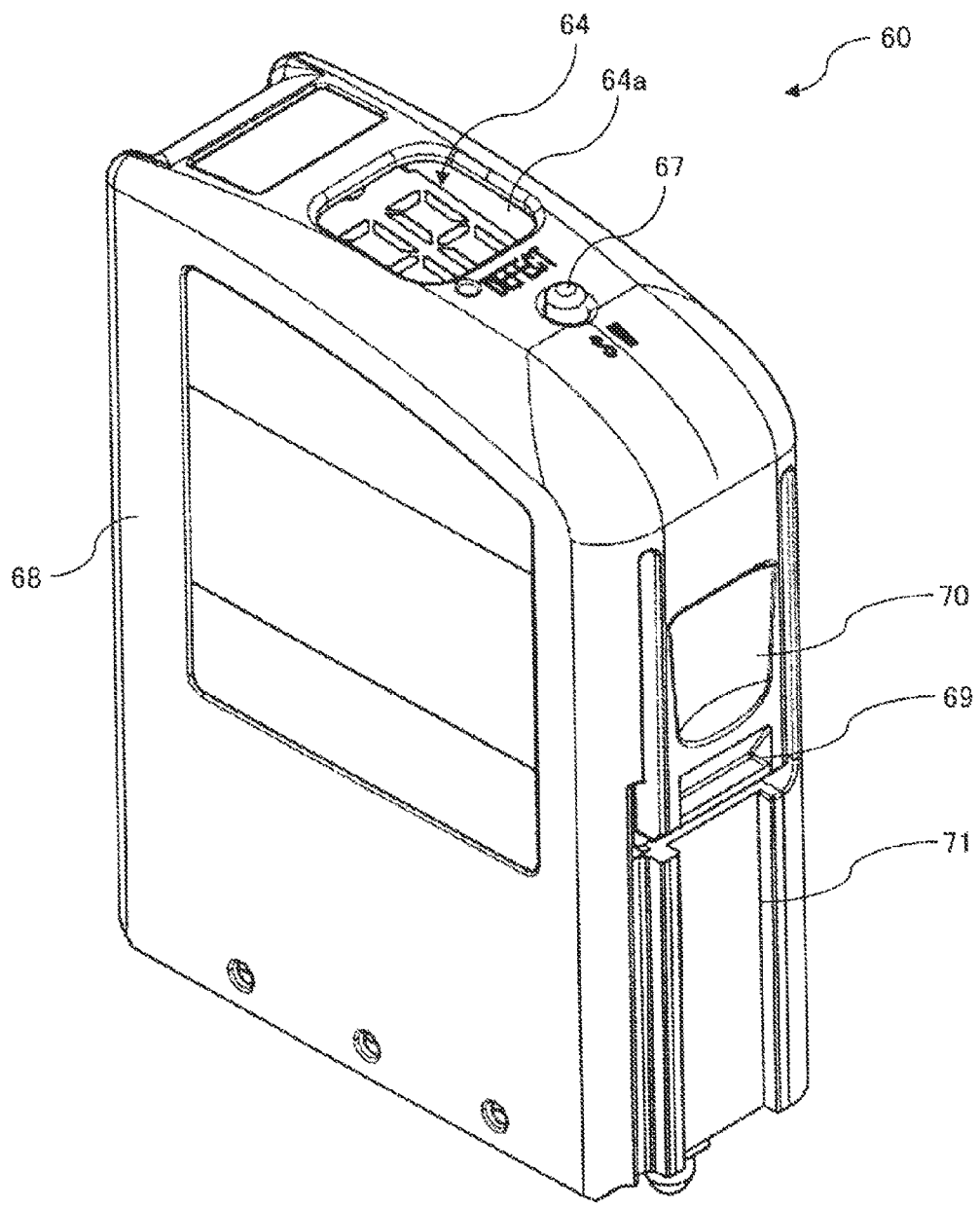
FIG. 13 is a perspective view illustrating the surge detector in FIG. 3.

FIG. 13 is a perspective view illustrating the surge detector 60 in FIG. 3. At the 2nd case 68 of the surge detector 60, a display unit 64, a confirmation button 67, an engagement concave part 69, a grip part 70 and a guiding part 71 are provided. The display unit 64 has a display window 64a which is provided on an upper face of the 2nd case 68 for displaying the number of times of processing n and the maximum current value im stored in the memory 63b2 in the control unit 63b. The confirmation button 67 which is an aggressiveness button switch in substantially cylindrical shape, is provided in the neighborhood of the display window 64a on the upper face of the 2nd case 68 for displaying the number of times of processing n and the maximum current value im at the display window 64a.

The engagement concave part 69 which is provided at the central part of the forward side face of the 2nd case 68, is engaged with the engagement convex part 33 of the plinth 10 to fix the 2nd case 68. The grip part 70 extends on the engagement concave part 69 at an upper part of the forward side face of the 2nd case 68. The engagement convex part 33 is disengaged from the engagement concave part 69 by the grip part 70 being pressed. The guiding part 71 is provided at a lower part of the forward side face of the 2nd case 68. The guiding part 71 has a projection which is engaged with the guiding part 34 of the plinth 10 to guide the 2nd case 68 when the 2nd case 68 is inserted into the plinth 10, and is provided for inserting the 2nd case 68 into the plinth 10 and guiding the 2nd case 68.

Figure 14:
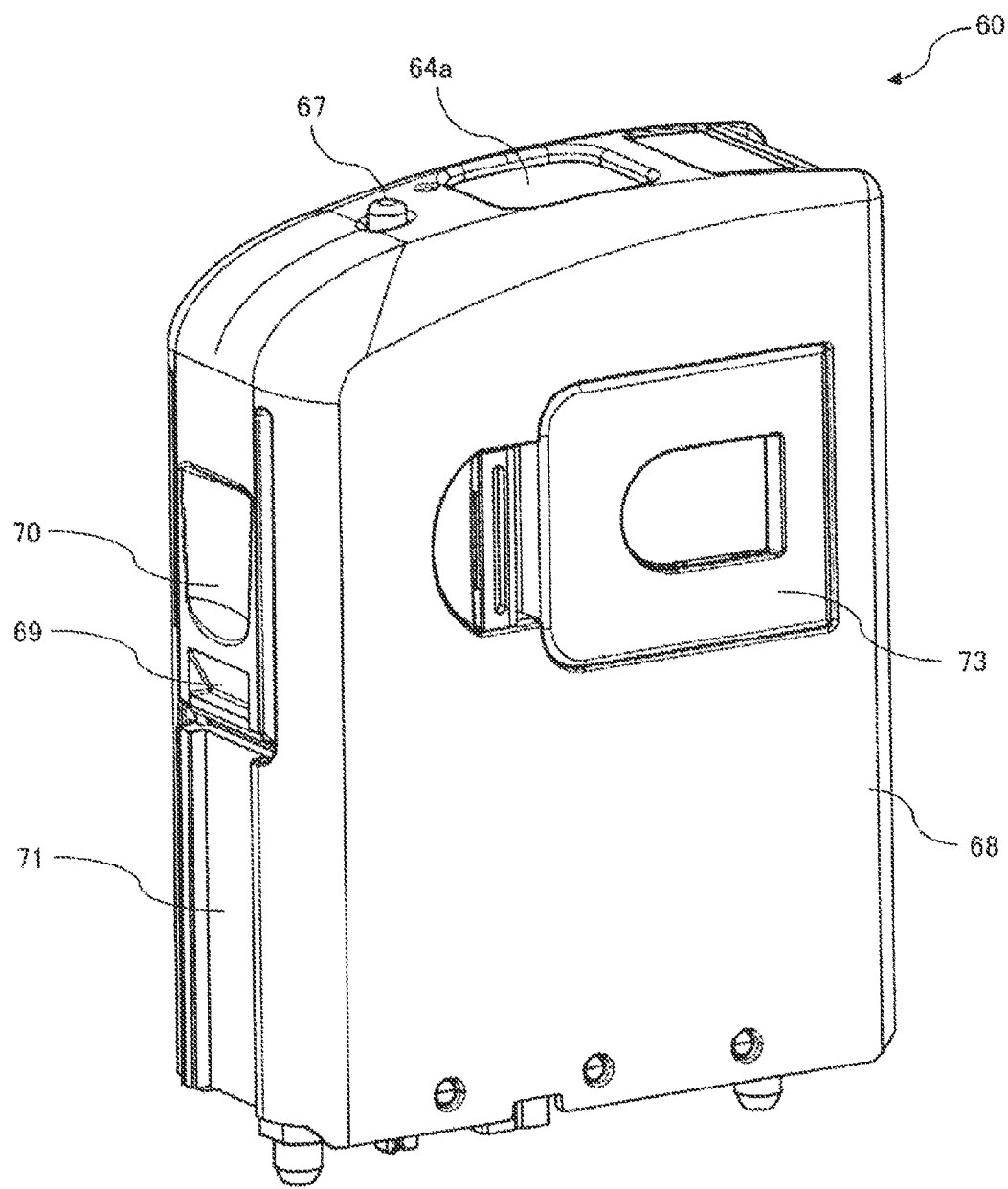
FIG. 14 is a perspective view of the surge detector in FIG. 13 viewed from a right side.

FIG. 14 is a perspective view of the surge detector 60 in FIG. 13 viewed from a right side. Further, FIG. 15 is a perspective view illustrating a state where the battery cover 73 of the surge detector 60 in FIG. 14 is removed.

Figure 15:
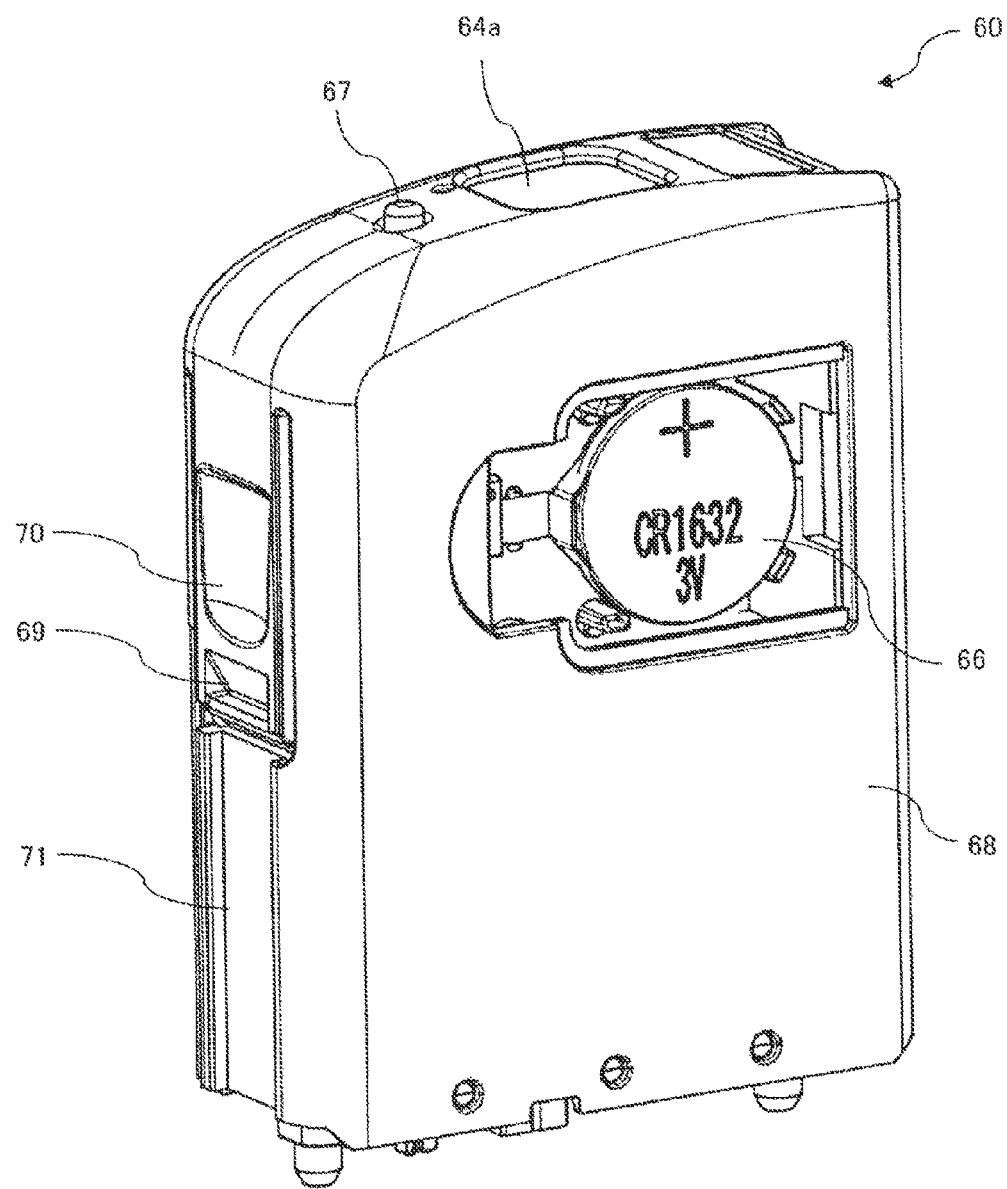
FIG. 15 is a perspective view illustrating a state where a battery cover of the surge detector in FIG. 14 is removed.

At the right side face of the 2nd case 68 illustrated in FIG. 15, a battery 66 is detachably stored. The battery cover 73 is provided on the right side face in the 2nd case 68 of the surge detector 60 illustrated in FIG. 14 so as to cover the battery 66. The reason why, in the first embodiment, the battery 66 is stored at the right side face of the 2nd case 68 is as follows.

For example, if the battery 66 is stored at the bottom face of the plinth 10, when the battery 66 is replaced, it is necessary to remove the whole of the surge protective system 1 from the DIN rail 85, which is inconvenient. Further, the ground wire 84 connected to the surge protective system 1 often does not have extra length, and is sometimes fixed to an SPD frame with a clamp. In such a case, it is necessary to also remove the ground wire connected to the surge detector 60, which is inconvenient. To solve such inconvenience, in the first embodiment, the battery 66 is stored at the right side face of the 2nd case 68.

Figure 16:
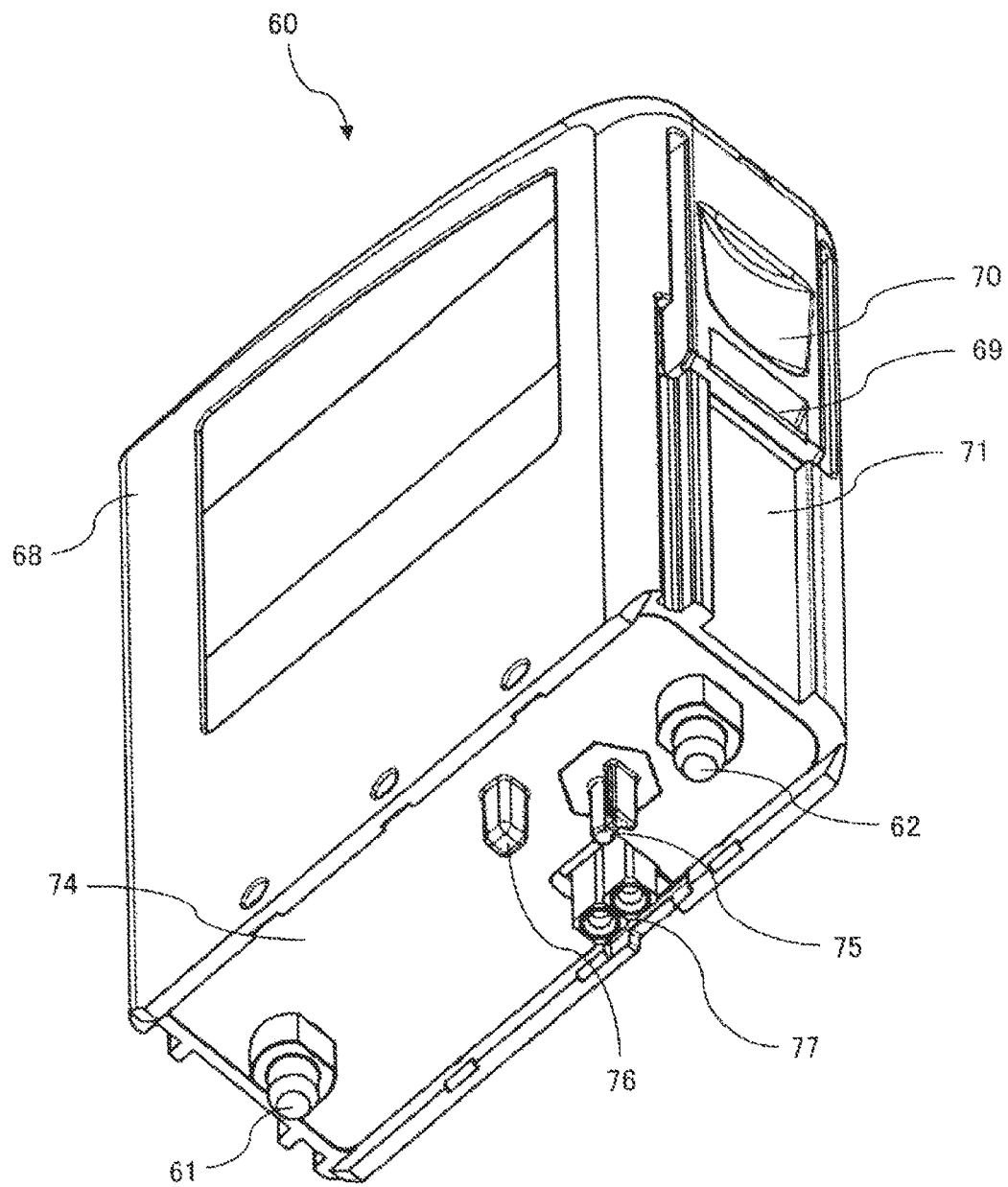
FIG. 16 is a perspective view of the surge detector in FIG. 13 viewed from below.

FIG. 16 is a perspective view of the surge detector 60 in FIG. 13 viewed from below. The surge detector 60 has a bottom cover 74 which blockades the lower part of the 2nd case 68. At the bottom cover 74, a 3rd contact 61 in substantially cylindrical shape, a 4th contact 62 in substantially cylindrical shape, an erroneous insertion prevention member 75, a switch pressing member 76 in substantially prismatic shape, and two connection terminals 77 in substantially cylindrical shape respectively project. The 3rd contact 61 is attached by insertion to the contact hole 28 of the plinth 10 so as to be connected to the 2nd plinth contact part 15. The 4th contact 62 is attached by insertion to the contact hole 29 of the plinth 10 so as to be connected to the 2nd plinth terminal part 13. The erroneous insertion prevention member 75 is provided for preventing the surge detector 60 from being inserted into an opposite direction. The switch pressing member 76 is inserted into the switch hole 31 to put a switch in the plinth 10 into an ON state. Further, the connection terminal 77 is inserted into the terminal hole 32.

Figure 17:
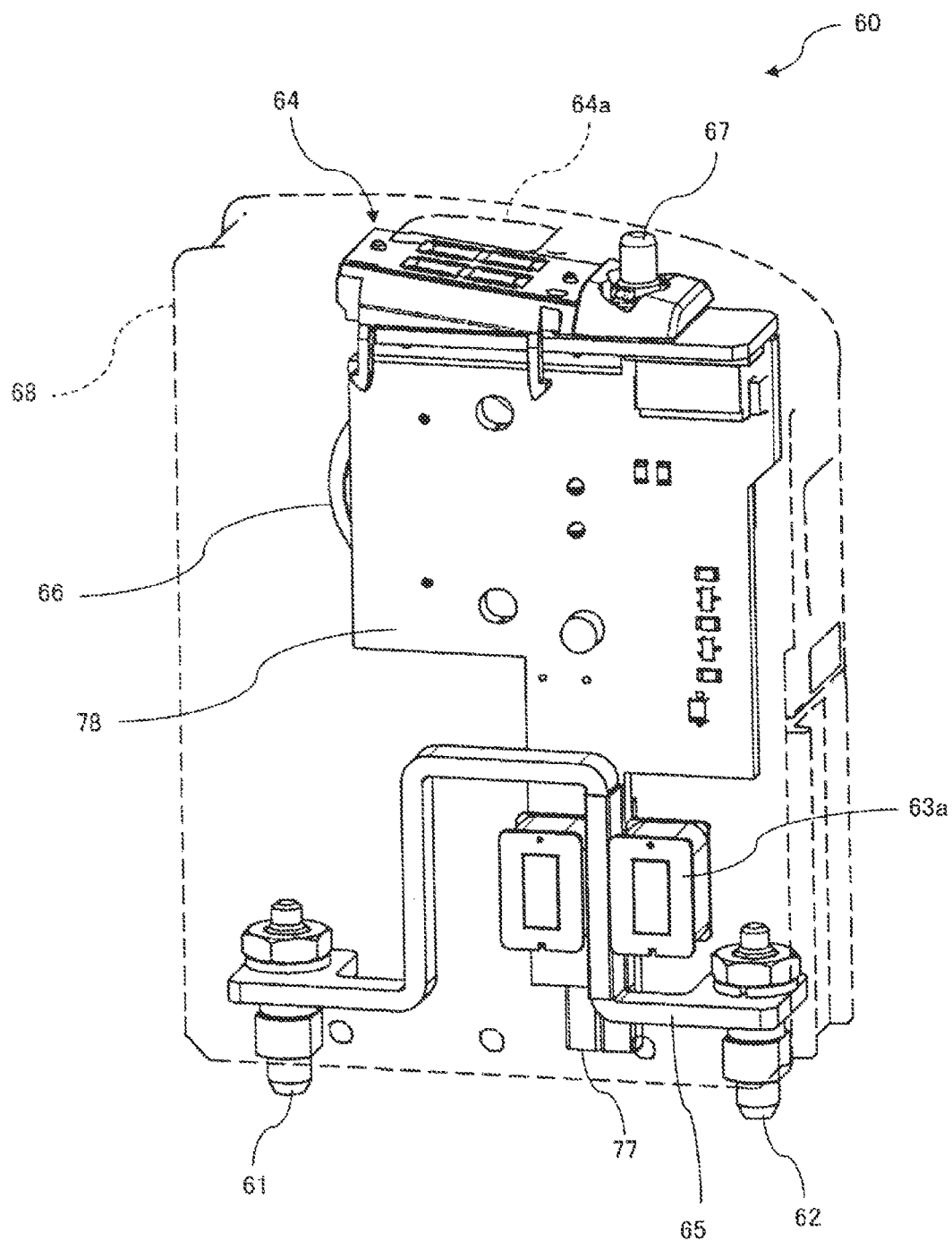
FIG. 17 is a transparent perspective view illustrating inside of the surge detector in FIG. 13.

FIG. 17 is a transparent perspective view illustrating inside of the surge detector 60 in FIG. 13. Inside the surge detector 60, a bar-like connection bar 65 is provided. The connection bar 65 which has a convex part in substantially inverted U shape, connects the 3rd contact 61 and the 4th contact 62. At an outer periphery of the convex part of the connection bar 65, a pair of detector coils 63a in substantially square shape are worn. Above the connection bar 65, a plate-like printed circuit board 78 for mounting electronic circuit parts, or the like, which configure the control unit 63b is provided. Above the printed circuit board 78, a display unit 64 having a display window 64a and a confirmation button 67 are provided. At a backside of the printed circuit board 78, the battery 66 is stored. Below and at the backside of the printed circuit board 78, the connection terminal 77 is allocated.

Operation of the Surge Protective System of the First Embodiment

Operation in the case where in the surge protective system 1 illustrated in FIG. 1 and FIG. 3, a lightning surge voltage is generated between, for example, the 1st plinth terminal part 11A and the 2nd plinth terminal part 13 by lightning strike, or the like, will be described.

If the lightning surge voltage is generated between the 1st plinth terminal part 11A and the 2nd plinth terminal part 13 illustrated in FIG. 1, the lightning surge current i flows to the SPD 40A from the line 81U through the line side wire 83A and the 1st plinth terminal part 11A. The lightning surge current i flowing to the SPD 40A flows to the varistor 43a through the 1st contact 41 and the separation mechanism 43b. When the lightning surge current i flows, the varistor 43a is put into a short circuit state to conduct, and discharges the lightning surge current i to the wiring metal fitting 12 through the 2nd contact 42. The lightning surge current i discharged to the wiring metal fitting 12 flows to the surge detector 60 through the 1st plinth contact part 14, the connection plate 16 and the 2nd plinth contact part 15. The lightning surge current i entering into the surge detector 60 flows to the 2nd plinth terminal part 13 through the 3rd contact 61, the connection bar 65 illustrated in FIG. 2 and the 4th contact 62. The lightning surge current i is then discharged to the ground GND through the ground wire 84. By this means, the equipment to be protected 82 is protected from the lightning surge voltage.

When the lightning surge current i flows to the connection bar 65, the lightning surge current i is detected by the detector coil 63a illustrated in FIG. 2, and an induced current generated at the detector coil 63a is output to the control unit 63b. The control unit 63b calculates a current value of the lightning surge current i from the input induced current. When the calculated current value is equal to or greater than a predetermined value, the control unit 63b increments the number of times of processing n stored in the memory 63b2 by 1. When the calculated current value is greater than the maximum current value im stored in the memory 63b2, the control unit 63b stores the calculated current value in the memory 63b2 as the maximum current value im. If the confirmation button 67 is pressed, the control unit 63b causes the number of times of processing n and the maximum current value im stored in the memory 63b2 to be displayed at the display window 64a. By this means, the user can know the number of times of processing n processed by the surge protective system 1 and the maximum current value im through the display window 64a.

Application Example of the Surge Protective System of the First Embodiment

Figure 18:
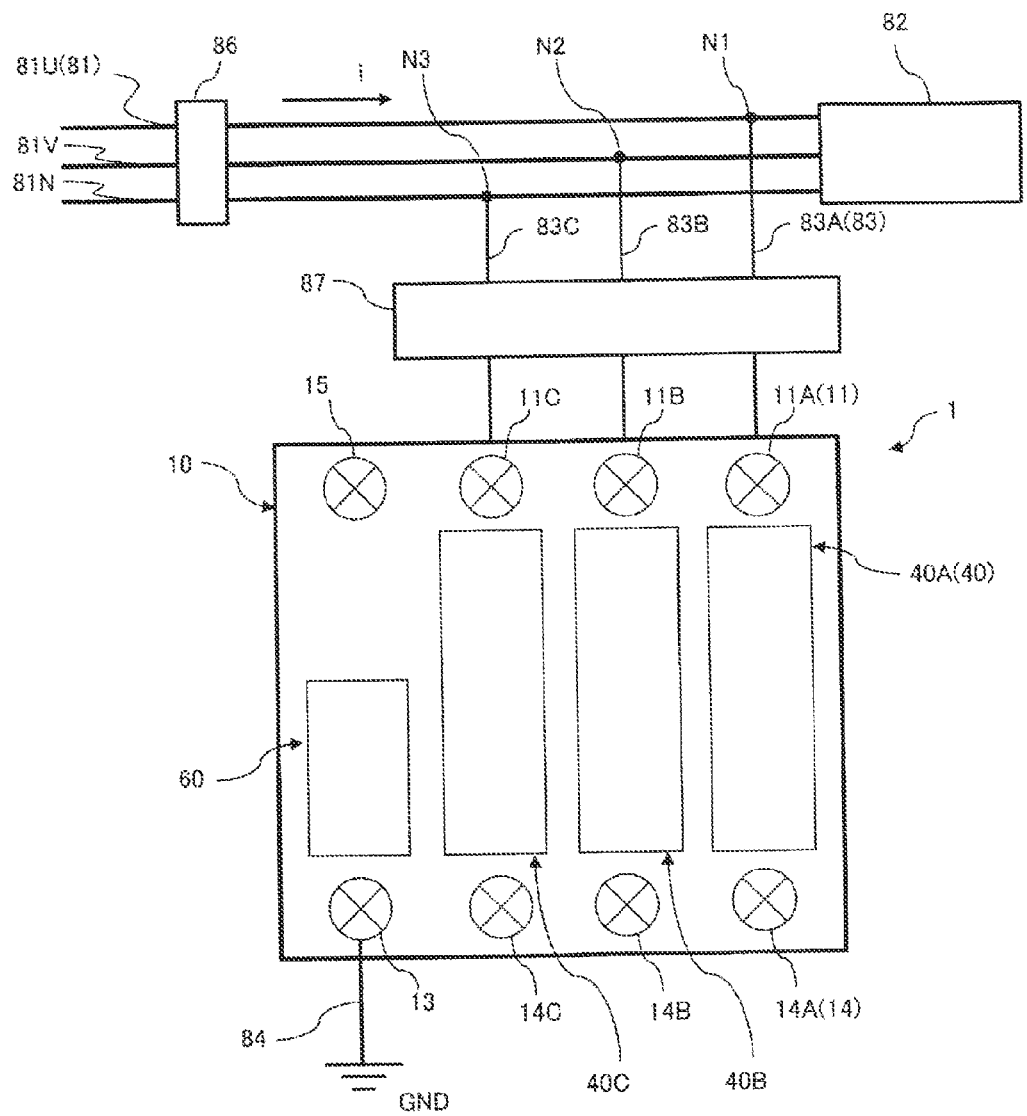
FIG. 18 is a schematic circuit configuration diagram illustrating an application example of the surge protective system in FIG. 1.

FIG. 18 is a schematic circuit configuration diagram illustrating an application example of the surge protective system 1 in FIG. 1. In this application example, a case will be described where the surge protective system 1 in FIG. 1 is provided at a secondary side of an earth leakage circuit breaker 86.

The surge protective system 1 is a system for protecting the equipment to be protected 82 connected to a plurality of lines 81 from the lightning surge current i. The earth leakage circuit breaker 86 is connected to an upstream side of the plurality of lines 81. The plurality of lines 81 are connected to the surge protective system 1 through three branch points N1, N2 and N3 and a circuit breaker for backup 87. The earth leakage circuit breaker 86 is a safety apparatus for detecting an over current due to a short circuit, or the like, and a leak current due to bad insulation, or the like, and blocking the lines 81. The circuit breaker for backup 87 is configured with a molded-case circuit breaker or a fuse.

When an extremely excessive lightning surge current which exceeds a design value is supplied to the surge protective system 1, the varistor 43a and the separation mechanism 43b may be damaged. Further, if the varistor 43a and the separation mechanism 43b are damaged, an abnormal current may continue to flow to the ground GND through the surge protective system 1 from the lines 81. To avoid such situation, the circuit breaker for backup 87 is provided between the lines 81 and the surge protective device 1 in addition to the earth leakage circuit breaker 86. By this means, it is possible to strengthen measure for the abnormal current, so that it is possible to improve safety of the lines 81.

Advantages of the First Embodiment

According to the surge protective system 1 of the first embodiment, the following advantages (A) to (D) are provided.

(A) The surge protective system 1 is configured such that the three SPDs 40 and the surge detector 60 are arranged on the plinth 10 in parallel. The 1st plinth terminal part 11 connected to the line side wire 83 is disposed at a side of the lines 81. The 2nd plinth terminal part 13 connected to the ground wire 84 is disposed at a side of the ground GND. Such a configuration is realized by the wiring metal fitting 12 being provided. By this means, even if there is small space for the distribution frame or the SPD frame, it is possible to store the surge protective system 1 while making the surge protective system 1 more compact without providing wiring for connecting from the side of lines 81 to the side of ground GND outside the surge protective system 1.

(B) The surge protective system 1 is configured such that one surge detector 60 is connected to the three SPDs 40. By this means, the number of parts of the surge protective system 1 can be reduced, so that the surge protective system 1 can be made more compact and stored in the small distribution frame or SPD frame.

(C) The plinth 10 of the surge protective system 1 stores the 1st plinth terminal part 11, the wiring metal fitting 12 and the 2nd plinth terminal part 13 in the base 17 without respectively fixing them. By this means, even if the base 17, the 1st plinth terminal part 11, the wiring metal fitting 12 and the 2nd plinth terminal part 13 deform due to temperature change, or the like, it is possible to prevent a case where it would be difficult to attach and remove the plurality of SPDs 40 and one surge detector 60.

(D) At the right side face of the 2nd case 68 of the surge detector 60, the battery cover 73 for storing the battery 66 is provided. By this means, it is possible to easily replace the battery 66 without removing the whole of the surge protective system 1 from the DIN rail 85.

Second Embodiment

Configuration of the Second Embodiment

Figure 19:
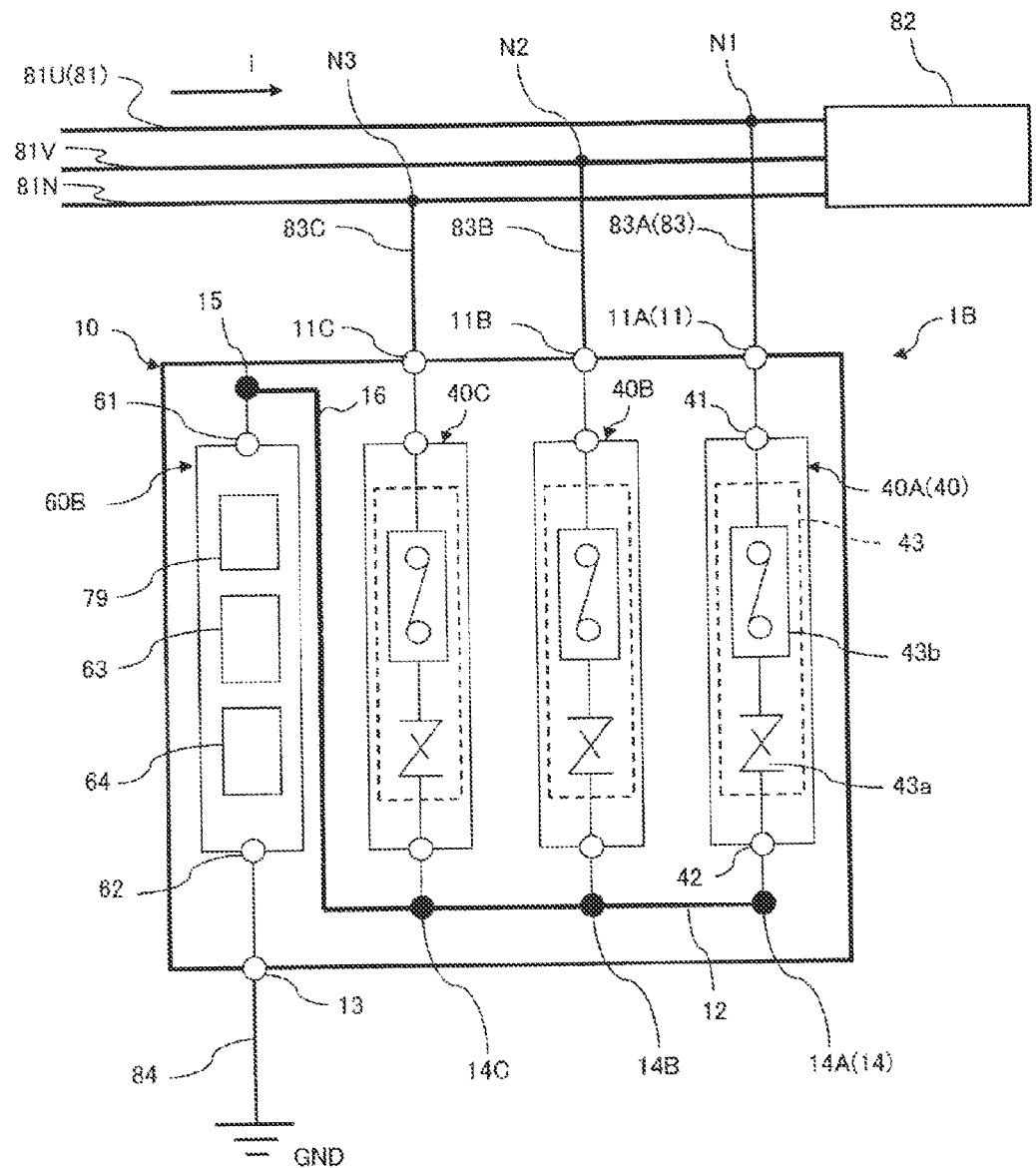
FIG. 19 is a schematic circuit configuration diagram illustrating the whole of a surge protective system according to a second embodiment of the present invention.

FIG. 19 is a schematic circuit configuration diagram illustrating the whole of a surge protective system 1B according to the second embodiment of the present invention, in which the same reference numerals are assigned to the same components as the components in FIG. 1 which illustrates the first embodiment.

The surge protective system 1B has a surge detector 60B which is different from the surge detector 60 in FIG. 1 in place of the surge detector 60 in FIG. 1. The surge detector 60B is different from the surge detector 60 in that an arrester 79 as a lightning device is connected between the 3rd contact 61 and the 4th contact 62. The arrester 79 is a lightning tube which discharges an input lightning surge current i. The other components of the surge protective system 1B are the same as the components of the surge protective system 1 in the first embodiment.

Operation of the Surge Protective System of the Second Embodiment

Operation in the case where in the surge protective system 1B illustrated in FIG. 19, a lightning surge voltage is generated between, for example, the 1st plinth terminal part 11A and the 2nd plinth terminal part 13 due to lightning strike, or the like, will be described.

When the lightning surge voltage is generated in the surge protective system 1B, a lightning surge current i enters into the surge protective system 1B as with the case of the surge protective system 1 in the first embodiment. The entering lightning surge current i flows to the surge detector 60B through, for example, the SPD 40A and the wiring metal fitting 12. The lightning surge current i flowing to the surge detector 60B is discharged by the arrester 79 and flows to the 2nd plinth terminal part 13 through the 4th contact 62. The lightning surge current i is then discharged to the ground GND through the ground wire 84. By this means, the equipment to be protected 82 is protected from the lightning surge voltage.

Application Example of the Surge Protective System of the Second Embodiment

Figure 20:
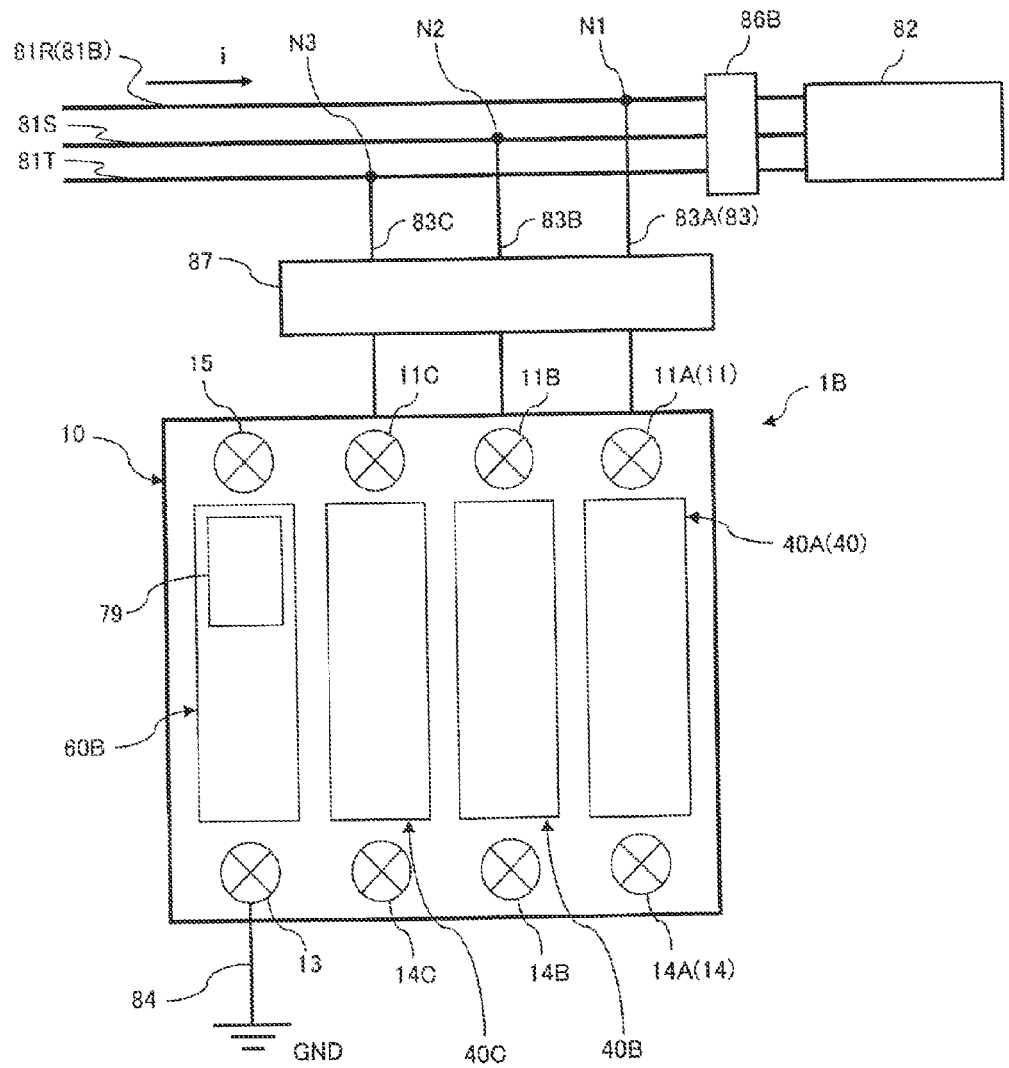
FIG. 20 is a schematic circuit configuration diagram illustrating an application example of the surge protective system in FIG. 19.

FIG. 20 is a schematic circuit configuration diagram illustrating the application example of the surge protective system 1B in FIG. 19, in which the same reference numerals are assigned to the same components as the components in FIG. 18 which illustrates the first embodiment.

In this application example, a case will be described where the surge protective system 1B in FIG. 19 is disposed at a primary side of an earth leakage circuit breaker 86B.

The surge protective system 1B is connected to a plurality of lines 81B of a power wire, which are different from the plurality of lines 81 in the first embodiment. The plurality of lines 81B which are, for example, three-phase three-wire power wires for supplying an input voltage (AC 200 V) without a ground phase, include three lines 81R, 81S and 81T. The earth leakage circuit breaker 86B which is a safety apparatus for detecting an over current due to a short circuit, or the like, and a leak current due to bad insulation, or the like, and blocking the lines 81B as with the earth leakage circuit breaker 86, is different from the application example of the surge protective system 1 in the first embodiment illustrated in FIG. 18 in that the earth leakage circuit breaker 86B is connected closer to the equipment to be protected 82 than the three branch points N1, N2 and N3. The other components of the surge protective system 1B is the same as the components of the surge protective system 1 in the first embodiment.

In the case of the second embodiment, even if the varistor 43a degrades over time, because the arrester 79 inhibits a leak current, a leak current does not flow from the surge protective system 1B. In this manner, because a leak current does not flow from the surge protective system 1B, the surge protective system 1B may be provided at the primary side of the earth leakage circuit breaker 86B.

It should be noted that when an extremely excessive lightning surge current which exceeds the design value flows to the surge protective system 1B, the varistor 43a, the separation mechanism 43b and the arrester 79 may be damaged as with the surge protective system 1 of the first embodiment. If the varistor 43a, the separation mechanism 43b and the arrester 79 are damaged, an abnormal current may continue to flow to the ground GND from the lines 81B through the surge protective system 1B. Therefore, in the second embodiment, the circuit breaker for backup 87 is provided between the lines 81B and the surge protective system 1B, so as to address the abnormal current and secure safety of the lines 81B.

While, in the second embodiment, the earth leakage circuit breaker 86B is provided between the three branch points N1, N2 and N3 and the equipment to be protected 82, in an actual field, there is a case where it is unclear whether or not there is an earth leakage circuit breaker 86B. In such a case, it is preferable to provide the surge protective system 1B having the arrester 79 as in the second embodiment rather than the surge protective system 1 of the first embodiment.

Advantages of the Second Embodiment

According to the surge protective system 1B of the second embodiment, a leak current from the surge protective device 40A is inhibited by the arrester 79 being provided at the surge detector 60B. By this means, the surge protective system 1B is applicable to more equipment to be protected 82.

Other Modified Examples of the First Embodiment and the Second Embodiment

The present invention is not limited to the above-described first embodiment and second embodiment, and other various usage states and modification are possible. The usage states and the modified examples include, for example, the following (a) to (e).

(a) While in the first embodiment and the second embodiment, a configuration has been described in which three surge protective devices 40 are provided at each of the surge protective systems 1 and 1B, this configuration may be changed such that one, two or four or more surge protective devices 40 are provided according to form of lines. Even if the configuration is changed in this manner, it is possible to provide the same advantages as those of the first embodiment and the second embodiment.

(b) While the connection plate 16 in the wiring metal fitting 12 in FIG. 7 is configured to have thin-plate shape, the connection plate 16 may have other shape such as thin-bar shape. Even if the shape is changed in this manner, it is possible to provide the same advantages as those of the first embodiment and the second embodiment.

(c) The surge detector 60 in FIG. 2 may have other circuit configurations.

(d) While the lines 81 illustrated in FIG. 1, FIG. 3, FIG. 18 and FIG. 19 are defined as single-phase three-wire power wires, and the lines 81B illustrated in FIG. 20 are defined as three-phase three-wire power wires, other power wires such as single-phase two-wire power wires may be used. Further, the lines 81 and 81B may be used as communication wires.

(e) While information of the number of times of processing n of the surge protective systems 1 and 1B and the maximum current value im is displayed at the display window 64a of the surge detector 60 illustrated in FIG. 13, or the like, other information may be displayed. Because in the surge protective systems 1 and 1B, performance of the varistor 43a and the arrester 79 degrades in accordance with increase of the number of times of processing, it is desirable to replace the surge protective systems 1 and 1B before the performance degrades. Therefore, for example, it is also possible to light a lamp for urging the user to replace the surge protective systems 1 and 1B at the display window 64*a* of the surge detector 60 if the number of times of processing of the surge protective systems 1 and 1B becomes equal to or greater than a predetermined value. By this means, it is possible to replace the surge protective systems 1 and 1B at an optimal timing and reliably protect the equipment to be protected 82.

What is claimed is:

1. A surge protective system comprising:
   a plinth for wiring;
   a plurality of surge protective devices disposed in parallel and detachably fitted into and attached to the plinth; and
   a surge detector disposed in parallel with respect to the surge protective devices and detachably fitted into and attached to the plinth,
   wherein the plinth comprises:
   a base in substantially box-like shape having an opening at an upper part;
   a cover comprising a base part covering the upper part of the base and a pair of 1st side wall part and a 2nd side wall part extending upward from both side faces of the base part;
   a plurality of 1st plinth terminal parts stored in the base and the cover, a plurality of line side wires inserted from an outer face of the 1st side wall part being respectively connected to the 1st plinth terminal parts;
   a 2nd plinth terminal part stored in the base and the cover, a ground wire inserted from an outer face of the 2nd side wall part being connected to the 2nd plinth terminal part; and
   a wiring metal fitting stored in the base and comprising a 1st plinth contact part, a 2nd plinth contact part, and a connection part connecting the 1st plinth contact part and the 2nd plinth contact part,
   each of the surge protective devices comprises:
   a 1st case in substantially box-like shape, detachably fitted and attached between the 1st side wall part and the 2nd side wall part; and
   a lightning protection circuit stored in the 1st case and discharging a lightning surge current entering from a side of each of the 1st plinth terminal parts to a side of the 1st plinth contact part, and
   the surge detector comprises:
   a 2nd case having substantially the same shape as the 1st case and detachably fitted and attached between the 1st side wall part and the 2nd side wall part;
   a detecting unit stored in the 2nd case, discharging the lightning surge current entering from a side of the 2nd plinth contact part to a side of the 2nd plinth terminal part and detecting a current value of the lightning surge current to obtain a lightning surge current detection result; and
   a display unit displaying the lightning surge current detection result so as to be able to be viewed from outside.

2. The surge protective system according to claim 1, wherein in the plinth,
   the plurality of line side wires inserted from a 1st opening part formed at the outer face of the 1st side wall part are respectively connected to the plurality of 1st plinth terminal parts,
   the ground wire inserted from a 2nd opening part formed at the outer face of the 2nd side wall part is connected to the 2nd plinth terminal part,
   the 1st plinth contact part is disposed so as to face the plurality of 1st plinth terminal parts, and
   the 2nd plinth contact part is disposed at a side of the plurality of 1st plinth terminal parts.

3. The surge protective system according to claim 2, wherein in the wiring metal fitting,
   the connection part is a thin-plate like connection plate,
   the 1st plinth contact part comprises:
   a thin-plate like support plate connected at one end of the connection plate in a direction substantially perpendicular to the connection plate; and
   a plurality of 1st plinth contacts in substantially tubular shape arranged and fixed on the support plate and having an opening at an upper end, and
   the 2nd plinth contact part comprises:
   a support member connected at the other end of the connection plate, which is an opposite side of the support member, in a direction substantially perpendicular to the connection plate; and
   a 2nd plinth contact in substantially tubular shape fixed on the support member and having an opening at an upper end.

4. The surge protective system according to claim 3, wherein in the wiring metal fitting,
   the connection part is stored in parallel with respect to the 1st case and the 2nd case in the base,
   the 1st plinth contact part is stored at a position facing the plurality of 1st plinth terminal parts at the side of the 2nd plinth terminal part in the base, and
   the 2nd plinth contact part is stored at the side of the plurality of 1st plinth terminal parts in the base.

5. The surge protective system according to claim 4, wherein
   each of the surge protective devices comprises:
   the 1st case;
   a 1st contact projecting on a bottom face of the 1st case and attached by insertion to the 1st plinth terminal part;
   a 2nd contact projecting on the bottom face of the 1st case and attached by insertion to the 1st plinth contact; and
   the lightning protection circuit stored in the 1st case and discharging the lightning surge current entering from the side of the 1st contact to the side of the 2nd contact,
   the surge detector comprises:
   the 2nd case;
   a 3rd contact projecting on a bottom face of the 2nd case and attached by insertion to the 2nd plinth contact;
   a 4th contact projecting on the bottom face of the 2nd case and attached by insertion to the 2nd plinth terminal part;
   a connection bar connecting between the 3rd contact and the 4th contact and discharging the lightning surge current entering from a side of the 3rd contact to a side of the 4th contact;
   the detecting unit stored in the 2nd case and detecting the current value of the lightning surge current flowing through the connection bar to obtain the lightning surge current detection result; and
   the display unit provided at a side of an outer face of the 2nd case.

6. The surge protective system according to claim 5, wherein
   the surge detector further comprises a lightning device connected on the connection bar.

7. The surge protective system according to claim 1, wherein
   the surge detector comprises a battery for supplying drive power, and
   the battery is detachably stored in a side face facing the 1st case.

8. The surge protective system according to claim 2, wherein
   the surge detector comprises a battery for supplying drive power, and
   the battery is detachably stored in a side face facing the 1st case.

9. The surge protective system according to claim 3, wherein
   the surge detector comprises a battery for supplying drive power, and
   the battery is detachably stored in a side face facing the 1st case.

10. The surge protective system according to claim 4, wherein
    the surge detector comprises a battery for supplying drive power, and
    the battery is detachably stored in a side face facing the 1st case.

11. The surge protective system according to claim 5, wherein
    the surge detector comprises a battery for supplying drive power, and
    the battery is detachably stored in a side face facing the 1st case.

12. The surge protective system according to claim 6, wherein
    the surge detector comprises a battery for supplying drive power, and
    the battery is detachably stored in a side face facing the 1st case.

* * * * *